US008001180B2

(12) United States Patent  (10) Patent No.: US 8,001,180 B2
Tomono  (45) Date of Patent: Aug. 16, 2011

(54) WEB PAGE DATA PROVIDING SYSTEM, WEB PAGE DATA PROVIDING METHOD, AND COMPUTER-READABLE MEDIUM

(75) Inventor: Kazuo Tomono, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 188 days.

(21) Appl. No.: 12/423,168

(22) Filed: Apr. 14, 2009

(65) Prior Publication Data

US 2009/0300104 A1  Dec. 3, 2009

(30) Foreign Application Priority Data

May 30, 2008  (JP) ................................. 2008-142460

(51) Int. Cl.
*G06F 15/16* (2006.01)
(52) U.S. Cl. .......................... 709/203; 709/217; 709/219
(58) Field of Classification Search .................. 709/203, 709/217–219
See application file for complete search history.

(56) References Cited

U.S. PATENT DOCUMENTS

| | | | | |
|---|---|---|---|---|
| 7,277,929 B2 * | 10/2007 | Ohara | ............................ | 709/219 |
| 7,401,136 B2 * | 7/2008 | Adams et al. | ................. | 709/223 |
| 7,613,824 B1 * | 11/2009 | Elberse et al. | ................ | 709/238 |
| 7,627,648 B1 * | 12/2009 | Mehta et al. | .................. | 709/217 |
| 7,720,936 B2 * | 5/2010 | Plamondon | .................... | 709/219 |
| 7,739,658 B2 * | 6/2010 | Watson et al. | ................. | 717/108 |
| 7,840,648 B1 * | 11/2010 | Rosenstein et al. | ........... | 709/218 |
| 7,941,430 B2 * | 5/2011 | Meema | ......................... | 707/724 |
| 2002/0156688 A1 * | 10/2002 | Horn et al. | ..................... | 705/26 |
| 2003/0101236 A1 * | 5/2003 | Ohara | ........................... | 709/218 |
| 2004/0102197 A1 * | 5/2004 | Dietz | ........................ | 455/456.1 |
| 2004/0153378 A1 * | 8/2004 | Perkowski | ...................... | 705/27 |
| 2005/0071421 A1 * | 3/2005 | Calo et al. | ....................... | 709/203 |
| 2008/0071929 A1 * | 3/2008 | Motte et al. | .................... | 709/246 |
| 2008/0288325 A1 * | 11/2008 | Pavlov | ........................... | 705/10 |
| 2009/0106108 A1 * | 4/2009 | Ku | ................................ | 705/14 |
| 2010/0121718 A1 * | 5/2010 | AlanDietz | ................. | 705/14.58 |

FOREIGN PATENT DOCUMENTS

| | | |
|---|---|---|
| JP | 2001-265758 | 9/2001 |
| JP | 2002-229973 | 8/2002 |
| JP | 2004-157783 | 6/2004 |

* cited by examiner

*Primary Examiner* — Faruk Hamza
(74) *Attorney, Agent, or Firm* — Fujitsu Patent Center

(57) ABSTRACT

A Web server machine 20, when receiving a request for a content containing a description of a campaign advertisement from any one of user machines 10 (step S201), reads a parts name defined as a structure (element) of Web page data for displaying the content from a content management table 24 (steps S202 through S204, step S301), acquires parts 33 specified by the parts name from a file server machine 30, generates the Web page data by combining the acquired parts 33 (step S307, steps S351 through S353), and sends the generated Web page data as a response to the user machine 10 (steps S311, S205, S207). It is therefore feasible to dynamically change details of the Web page, and the Web page is listed up in a high order of a search result of a search engine.

9 Claims, 20 Drawing Sheets

FIG. 4

24: CONTENT MANAGEMENT TABLE

| CONTENT CODE | CONTENT NAME | CONTENT | MODEL NUMBER | URL |
|---|---|---|---|---|
| 00010 | CAMPAIGN | $HEADER<br>$CAMPAIGN01<br>$FOOTER<br>$FMVCE100_IMG<br>$FMVCE100_KAKAKU | FMVCE100 | fujitsu.com/campaign/FMVCE100/ |
| ... | ... | ... | ... | ... |

| START DATE/TIME | END DATE/TIME | SOLD-OUT FLAG | SUBSTITUTE PAGE |
|---|---|---|---|
| 200804010000 | 200804300000 | 1 | fujitsu.com/campaign/FMVCE120/ |
| ... | ... | ... | ... |

FIG. 6

33: PARTS EXAMPLE ($HEADER.TXT)

```
<?xml version="1.0" encoding="Shift_JIS"?>
<!DOCTYPE html PUBLIC "-//W3C//DTD XHTML 1.0 Strict//EN" "http://www.w3.org/TR/xhtml1/DTD/xhtml1-strict.dtd">
<html xmlns="http://www.w3.org/1999/xhtml" sml:lang="ja">
<head>
<title> DESKTOP PC, SALES OF NOTEBOOK TYPE PERSONAL COMPUTER [FUJITSU WEB MART] </title>
</head>
```

FIG. 7

33 : PARTS EXAMPLE ($CAMPAIGN01.TXT)

```
<div class="bodyarea">
<div id="location">
<ol>
<li><a href="http://jp.fujitsu.com/"> HOME </a> ></li>
<li> FUJITSU SHOPPING SITE WEB MART </li>
</ol>
</div>
<dt> JULY 4 [WEB LIMITED DESIGN: <span style="letter-spacing: -0.1em"> LOOK 9 COLORS.]</span></dt>
<dd><img href="$FMVCE100_IMG" alt=" COLOR VARIATIONS IN ALL 9 COLORS ARE PREPARED! SPECIAL PRICE OF THE LATEST MOBILE PC FMV-BIBLO LOOX T SERIES! "></dd>
<dt>$FMVCE100_KAKAKU TILL JULY 9 [OUTLET] </dt>

< THE REST IS OMITTED >
```

FIG. 8

33: PARTS EXAMPLE ($FOOTER.TXT)

```
</a>
<div class="footer">
<div class="navihidden"><img src="/image/common/space.gif" width="1" heigh
t="1" alt=" COMMON MENU IN SITE FROM HERE " /></div>
<div id="permanentmenu">
<ul>
<li class="firstchild"> <a class="firstchild" href="http://jp.fujitsu
.com/"> FUJITSU HOME </a> </li>
<li> <a href="http://jp.fujitsu.com/about/"> OUTLINE OF COMPANY </a>&nbs
p;</li>
</div>
<div id="cleditline">
<p><a href="http://jp.fujitsu.com/copyright/"><img src="/imgae/common/
copyright.gif" width="155" height="15" alt=" Copyright FUJITSU " /></a><p>
</div>
<div class="navihidden"><img src="/image/common/space.gif" width="1" hei
ght="1" alt=" END OF PAGE " /></div>
</div>
</div>
```

FIG. 9

34: PARTS MANAGEMENT TABLE

| PARTS CODE | PARTS NAME | STORAGE LOCATION | OUTPUT CHARACTERS |
|---|---|---|---|
| 00010 | $HEADER | /HEADER.TXT | — |
| 00020 | $CAMPAIGN01 | /CAMPAIGN01.TXT | — |
| 00030 | $FOOTER | /FOOTER.TXT | — |
| 00040 | $FMVCE100_IMG | /FMVCE100.img | — |
| 00050 | $FMVCE100_KAKAKU | — | ¥10,000 |
| 00060 | $CAMPAIGN02 | /CAMPAIGN02.TXT | — |
| ... | ... | ... | ... |

FIG. 15

| CONTENT EDIT SCREEN | |
|---|---|
| CONTENT CODE | 00010 ~52a |
| CONTENT NAME | campaign01 ~52b |
| CONTENT | $HEADER<br>$CAMPAIGN<br>$FOOTER<br>$FMVCE100_IMG<br>$FMVCE100_KAKAKU ~52c |
| MODEL NUMBER | fmvce100 ~52d |
| URL | fujitsu.com/campaign/FMVCE100 ~52e |
| START DATE/TIME | 200804010000 ~52f |
| END DATE/TIME | 200804300000 ~52g |
| SUBSTITUTION WHEN SOLD OUT | ○ NOT SUBSTITUTED   ● SUBSTITUTED<br>52i  52i' |
| SUBSTITUTE PAGE URL | ~52h |

REGISTRATION (OVERWRITE) 52j    STOP 52k

52

WEB PAGE DATA PROVIDING SYSTEM, WEB PAGE DATA PROVIDING METHOD, AND COMPUTER-READABLE MEDIUM

CROSS-REFERENCE TO RELATED APPLICATION

This application is based upon the benefit of priority of the prior Japanese Patent Application No. 2008-142460, filed on May 30, 2008, the entire contents of which are incorporated herein by reference.

FIELD

The disclosures made herein relates to a system, a method, and computer-readable medium for providing Web page data.

BACKGROUND

As mentioned in documents such as Patent document 1, it is known that a scheme that a Web page creation support server searches a template of the Web page data in a way that uses a keyword designated by a user terminal as a search condition, and the user terminal creates the Web page data by use of the searched template and uploads the Web page data to a Web server.

According to this scheme, in the case of trying to change at least some elements of details of the Web page corresponding to a time of year, an editor must edit the Web page data and must upload the Web page data to the Web server each time.

As mentioned in documents such as Patent document 2, it is known that a scheme that the Web server, upon receiving a request, starts up a CGI [Common Gateway Interface] program, a CGI function utilized by the CGI program executes a process of replacing each of the keywords listed up in the template with data associated with the keyword, and the Web server sends, as a response, the Web page data for displaying the template after the replacement process.

According to this scheme, if the data associated with the keyword changes moment by moment, it follows that values in the template displayed based on the Web page data given as the response from the Web server change moment by moment. Herein, URL [Uniform Resource Locator] must contain parameters in order to start up the CGI program, however, a general type of search engine determines the Web page having the URL containing the parameters to be a dynamic Web page and therefore does not list up the Web page in a high order of a search result.

[Patent document 1] Japanese Laid-Open Application Publication No. 2004-157783
[Patent document 2] Japanese Laid-Open Application Publication No. 2001-265758
[Patent document 3] Japanese Laid-Open Application Publication No. 2002-229973

SUMMARY

According to an aspect of the invention, a Web page data providing system includes: a first reading unit configured to read, when receiving a request including a piece of location information from any one of Web clients via a network, out of a content management table stored with some pieces parts identifying information selected from within plural pieces of parts identifying information for specifying parts described in a markup language as some elements of Web page data and the location information allocated to the single Web page data organized by the parts specified by some pieces of selected parts identifying information in a way that associates the parts identifying information and the location information with each other, the parts identifying information associated with the location information included in the received request; a second reading unit configured to read, from a parts management table stored with associated information organized by associating the parts identifying information of the parts with storage location information for specifying a storage location of the parts with respect to every parts, the storage location information associated with the parts identifying information read out by the first reading unit; a generating unit configured to acquire the parts from the storage location specified by the storage location information read out by the second reading unit, and to generate the single Web page data based on the acquired parts; and a transmitting unit configured to transmit the Web page data generated by the generating unit to the Web client that sends the request.

The purpose and advantages of the embodiments will be realized and attained by means of the elements and combinations particularly pointed out in the claims.

It is to be understood that both the foregoing general description and the following detailed description are exemplary and explanatory and are not restrictive of the embodiments, as claimed.

BRIEF DESCRIPTION OF DRAWINGS

FIG. 4 illustrates a schematic diagram of a content management table.

FIG. 6 illustrate an example of parts.

FIG. 7 illustrate an example of parts.

FIG. 8 illustrate an example of parts.

FIG. 9 illustrates a schematic diagram of a parts management table.

FIG. 15 illustrates one example of a content edit screen.

DESCRIPTION OF EMBODIMENTS

A direct selling system will hereinafter be described by way of an embodiment with reference to the drawings.

Note that the direct selling system according to the preset embodiment is a system for directly selling company's products of a maker administering a Web site to system users via a network.

<<Configuration>>

Figure 1:
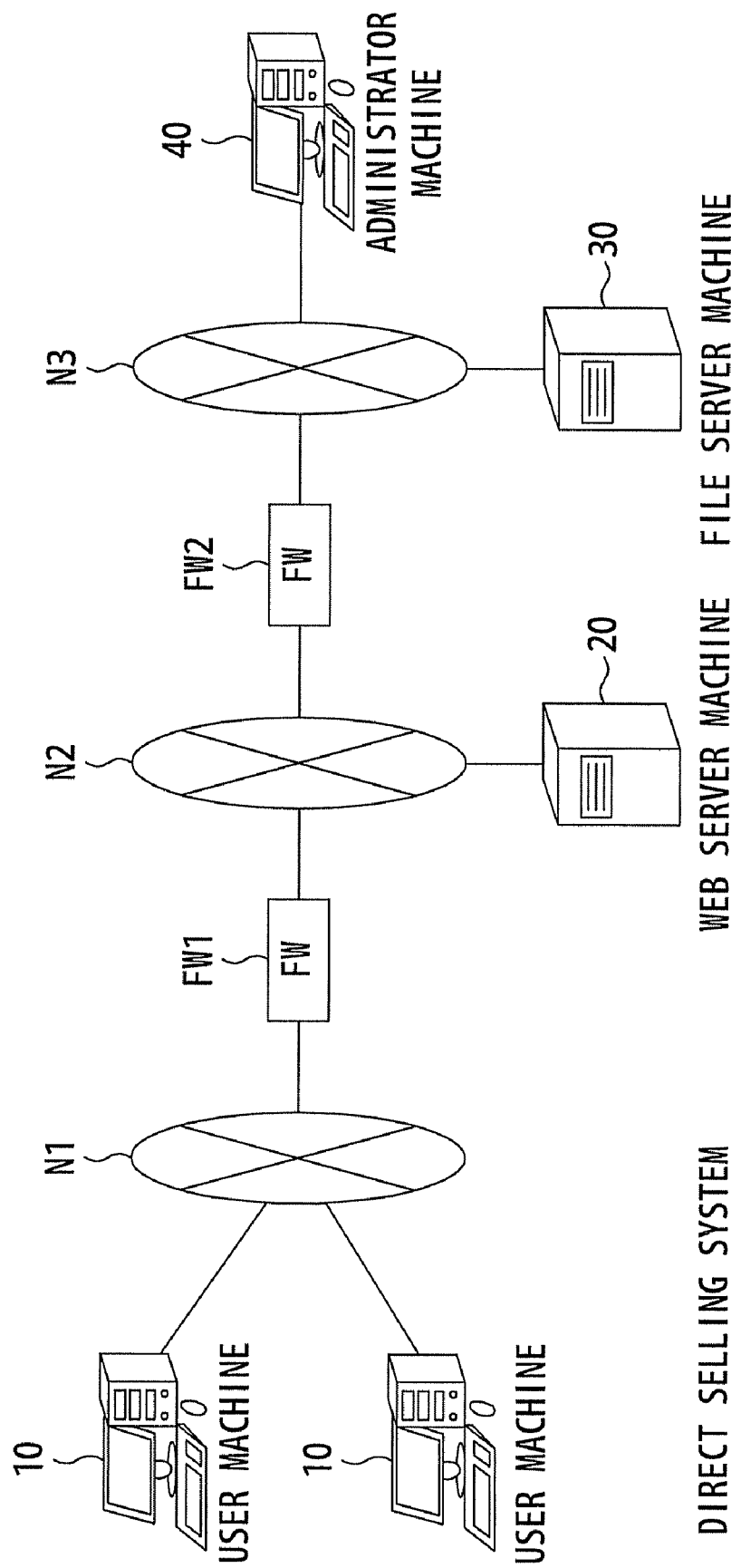
FIG. 1 illustrates a configuration of a direct selling system in an embodiment.

FIG. 1 illustrates a configuration of the direct selling system in the embodiment.

As illustrated in FIG. 1, the direct selling system according to the embodiment includes a user machine 10, a Web server machine 20, a file server machine 30, and an administrator machine 40.

One or more user machines 10 are connected to a first network N1 and are enabled to perform communications with unillustrated computers connecting with the first network N1. The Web server machine 20 is connected to a second network N2 and is enabled to perform the communications with the unillustrated computers connecting with the second network N2. The file server machine 30 and the administrator machine 40 are connected to a third network N3 and are enabled to perform the communications with the unillustrated computers connecting with the third network N3.

The first network N1 is connected via a first firewall FW1 to the second network N2, and the second network N2 is connected to a second firewall FW2 to the third network N3.

Herein, the first firewall FW1 is a computer which permits a communication packet from the second network N2 to transmit but cuts off the communication packet from the third network N3. Further, the second firewall FW2 is a computer which permits the communication packet from the second network N2 to transmit but cuts off the communication packet from the first network N1.

This scheme enables the user machine 10 to access the Web server machine 20 but disables the user machine 10 from accessing the file server machine 30 and the administrator machine 40. On the other hand, this scheme enables the administrator machine 40 to access the Web server machine 20 but disables the administrator machine 40 from accessing the user machine 10. Accordingly, the second network N2 functions as a DMZ [DeMilitarized Zone].

Figure 2:
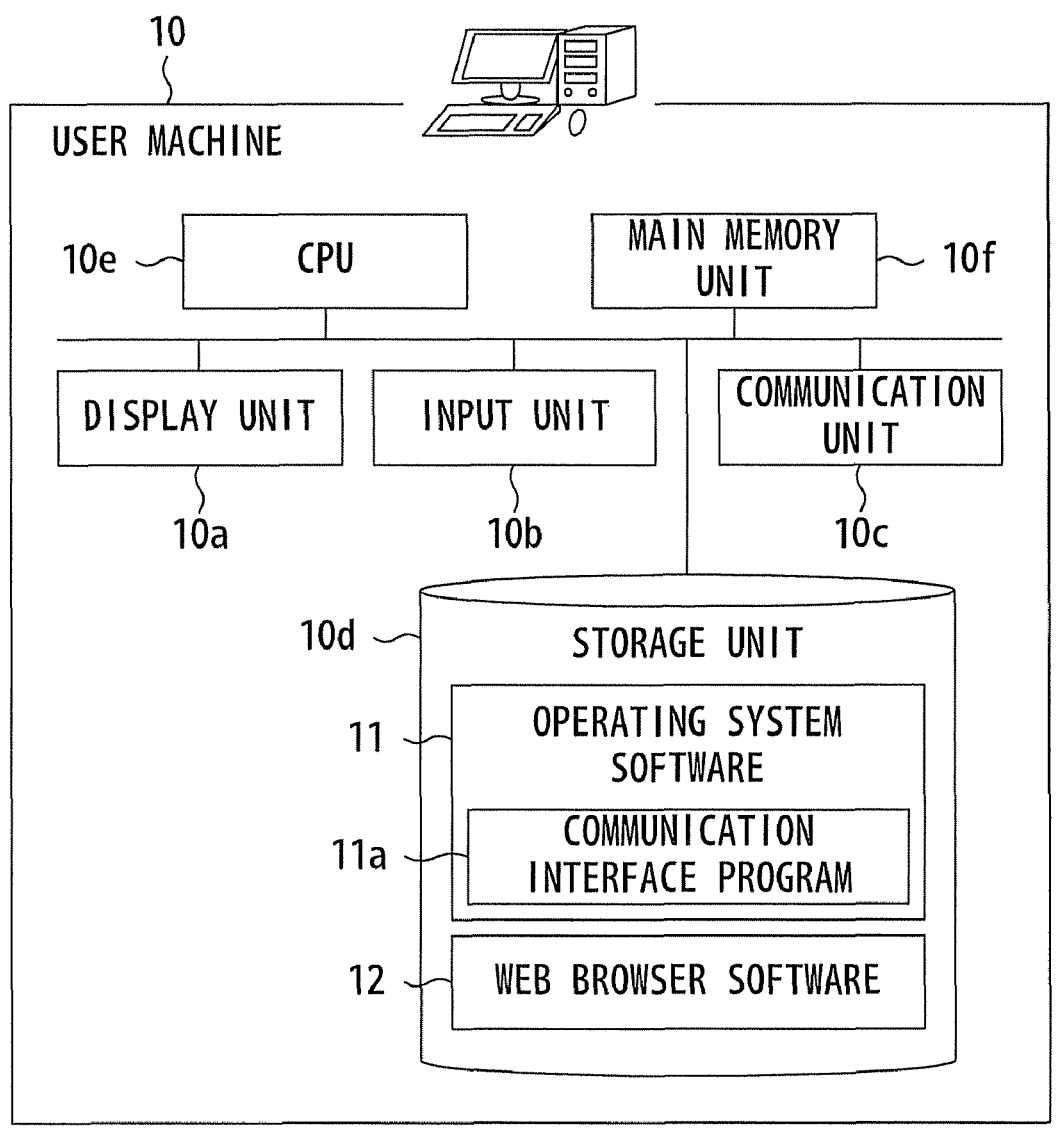
FIG. 2 illustrates a configuration of a user machine.

FIG. 2 illustrates a configuration of the user machine 10.

The user machine 10 is a personal computer to which a Web browser function that will be mentioned later on is added. Accordingly, the user machine 10 is constructed of a display unit 10a including a liquid crystal display etc, an input unit 10b including a keyboard, a mouse, etc, and a main body connected to these units 10a, 10b. Further, the main body has a communication unit 10c, a storage unit 10d, a CPU [Central Processing Unit] 10e, and a main memory unit 10f, which are built in the main body.

The communication unit 10c is a unit for transferring and receiving data to and from other computers on a first network N1. The communication unit 10c is exemplified by a LAN adaptor. The storage unit 10d is a unit for recording a variety of programs and various items of data. The CPU 10e is a unit which executes the processes according to the program in the storage unit 10d. The main memory unit 10f is a unit for cashing the program and the data and for developing an operation area.

The storage unit 10d of the user machine 10 is stored with operating system (OS) software 11. The OS software 11 is software for providing an API [Application Programming Interface] and an ABI [Application Binary Interface] to a variety of applications, managing storage areas of the storage unit 10d and the main memory unit 10f, managing a process and a task, conducting file management, providing a variety of setting tools and editors to utility applications, and allocating windows to a plurality of tasks for multiplexing a screen output. Further, the OS software 11 includes a communication interface program 11a. The communication interface program 11a is a program for transferring and receiving the data to and from the communication interface programs of other computers connected via the communication unit 10c.

The communication interface program is based on, e.g., a TCP/IP [Transmission Control Protocol/Internet Protocol] stack.

Further, the storage unit 10d of the user machine 10 is stored with Web browser software 12. The Web browser software 12 is software for adding, to the computer, a Web browser function for acquiring the Web page data from the Web server according to an instruction from an operator and displaying the Web page. To be specific, (the CPU 10e based on) the Web browser software 12, when given an instruction from the operator to click a link button within the Web page or to input the URL [Uniform Resource Locator] into a Web browser screen or an instruction to acquire the Web page data through image tags or frame tags described within the Web page data, transmits a request message for requesting the transmission of the Web page data designated by the URL in this instruction to the Web server, then receives a response message from the Web server, and displays the Web page on a display unit 10a on the basis of the Web page data in a body of the response message.

Figure 3:
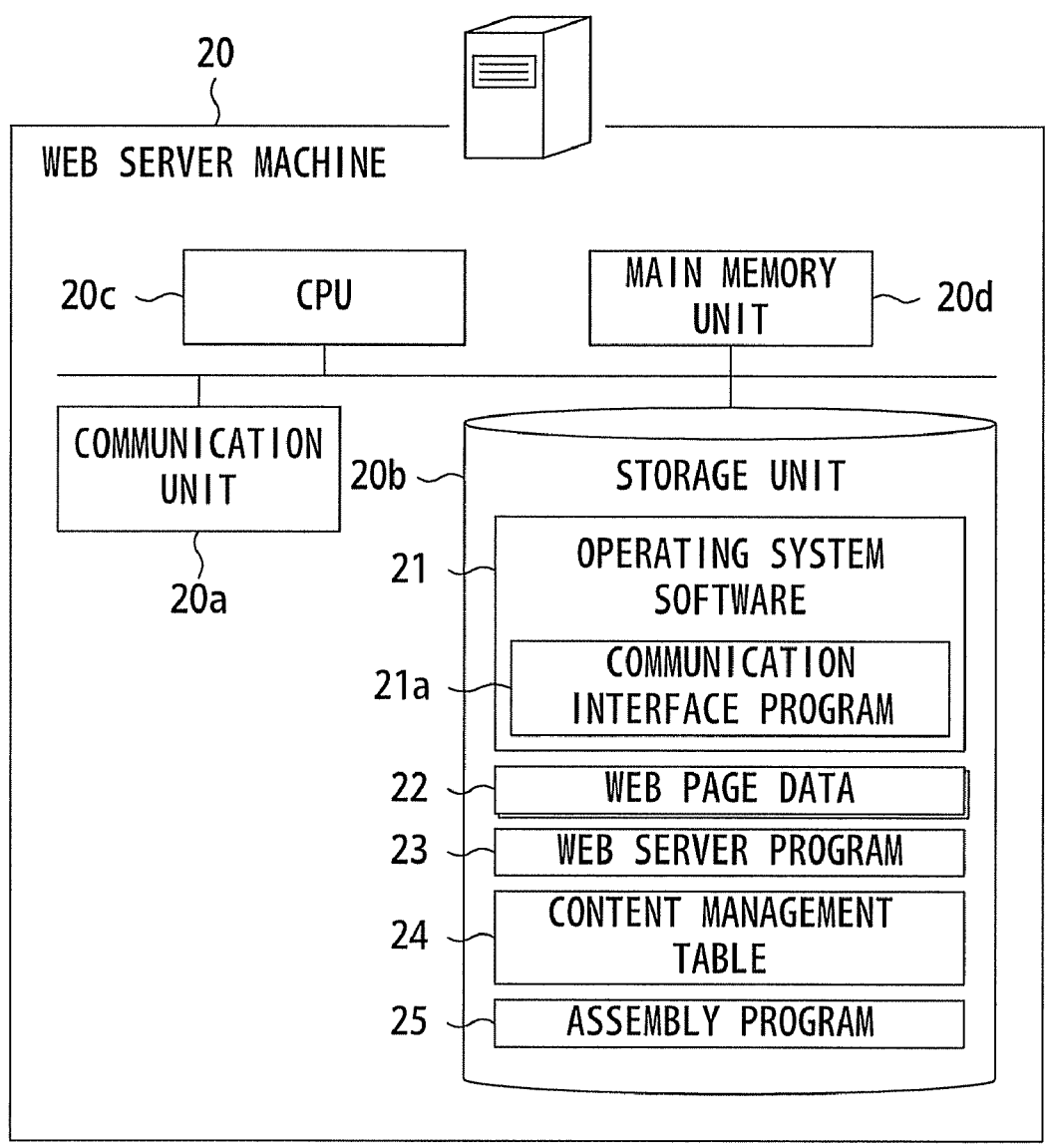
FIG. 3 illustrates a configuration of a Web server machine.

FIG. 3 illustrates a configuration of the Web server machine 20.

The Web server machine 20 is a general-purpose computer to which a Web server function, which will be described alter on, is added. Accordingly, the Web server machine 20 includes a communication unit 20a, a storage unit 20b, a CPU 20c, and a main memory unit 20d. The respective units 20a-20d are units exhibiting the same functions as those of the user machine 10.

The storage unit 20b of the Web server machine 20 is stored with operating system (OS) software 21. The OS software 21 is software exhibiting the same function of the user machine 10 and includes a communication interface program 21a.

Further, the storage unit 20b of the Web server machine 20 is stored with Web page data 22 and a Web server program 23. The Web page data 22 is data for displaying the Web page and is specifically exemplified such as HTML [HyperText Markup Language] image and image data. The Web pages displayed based on the Web page data 22 configure a Web site. Namely, the Web site is configured by the Web server machine 20. Further, the Web page data 22 in the embodiment contains Web page data for displaying a top page of the Web site.

The Web server program 23 is a program for transmitting the Web page data 22 in response to a request given from a Web client (a Web page data acquiring function contained in the Web browser software 12). Moreover, the Web server program 23 in the embodiment is also a program for acquiring, when receiving a request designating a predetermined URL from the Web client, the Web page data for displaying a content that will be mentioned later on from an assembly program that will hereinafter be described and transmitting the Web page data to the Web client. Details of processes executed by the CPU 20c according to the Web server program 23 will be explained later on with reference to FIG. 18.

Further, the storage unit 20b of the Web server machine 20 is stored with a content management table 24.

FIG. 4 illustrates a schematic diagram of the content management table 24.

The content management table 24 is a table for managing, as a content, the Web page on which to describe a campaign advertisement about commercial products that are sold directly to users by an administrator (maker) of the Web site configured by the Web server machine 20. As illustrated in FIG. 4, each of records of the content management table 24 includes fields such as a [content code], a [content name], a [content], a [model number], a [URL], a [start date/time], an

[end date/time], a [sold-out flag], and a [substitute page]. The [content code] field is a field recorded with a content code defined as identifying information for specifying the content. The [content name] field is a field recorded with a name of the content. The [content] field is a field recorded with a structure of the Web page data for displaying the content. Note that the structure of the Web page data is specified by a name of parts that will be mentioned later on. The [model number] field is a field recorded with a model number for specifying the commercial product described in the campaign advertisement in the content. The [URL] field is a field recorded with the URL defined as location information allocated to the content. The [start date/time] field and the [end date/time] field are fields respectively recorded with a start date/time and an end date/time of a public viewing period of the content. The [sold-out flag] field is a field recorded with a sold-out flag for defining which Web page data of the substitute page and the top page that will be described later on is given as a response if an in-stock count of the commercial products related to the content is "0". Incidentally, there are made a definition that the Web page data 22 of the substitute page which will be mentioned later on should be given as the response if the sold-out flag is set in a [1] status, and a definition that the Web page data of the top page should be given as the response if the sold-out flag is set in a [0] status. The [substitute page] field is a field recorded with the URL of the substitute page given as the response to the Web client if the sold-out flag is set in the [1] status in a case where the in-stock count of the commercial products related to the content is "0". Note that the [substitute page] field is blank when if the sold-out flag is set in the [0] status.

Further, the Web server machine 20 has a storage unit 20b in FIG. 3, which is stored with an assembly program 25. The assembly program 25 is a program for generating Web page data for displaying contents from parts that will be described later on. Details of processes executed by a CPU 20c based on the assembly program 25 will be explained later on with reference to FIGS. 19 and 20.

Figure 5:
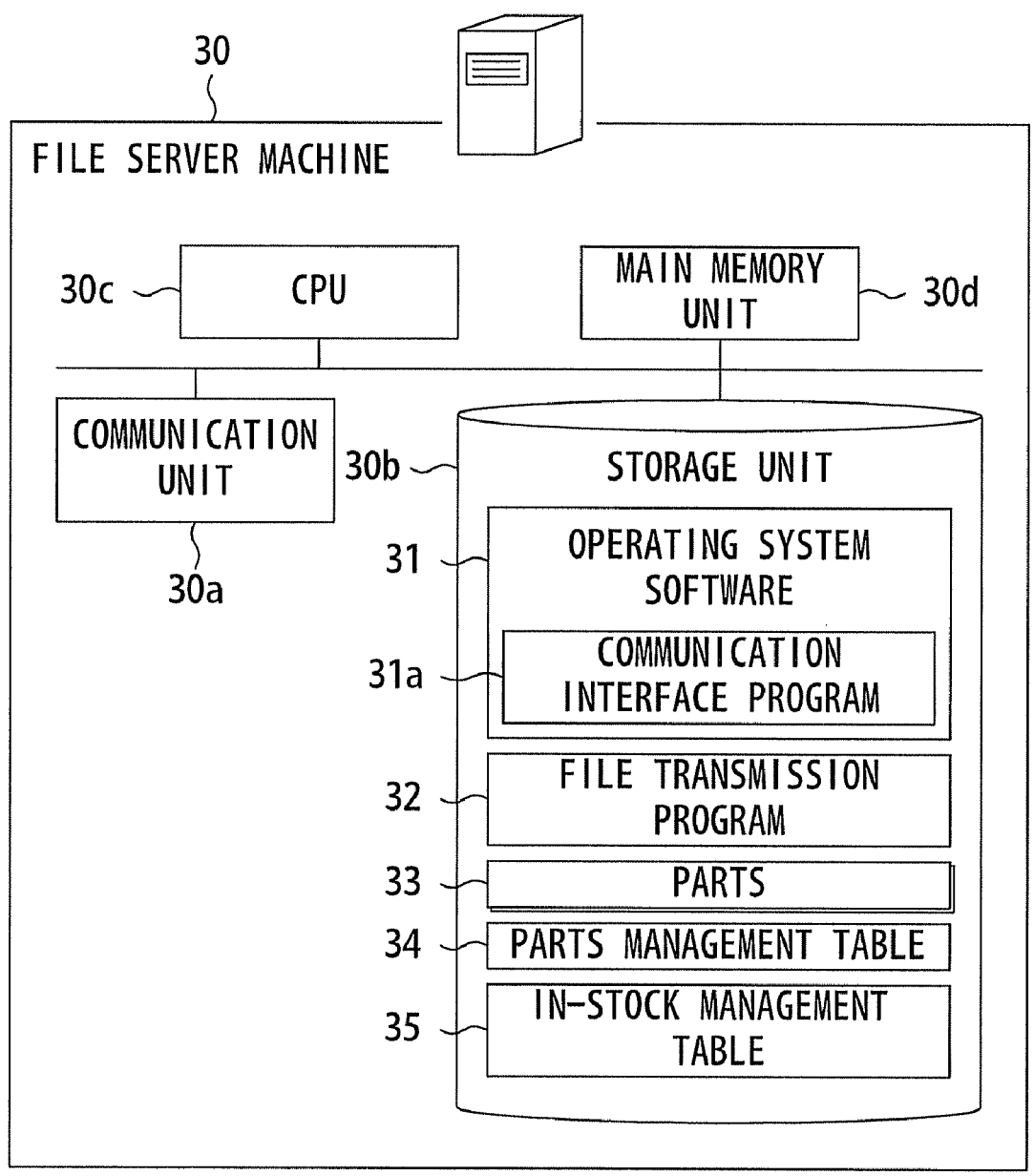
FIG. 5 illustrates a configuration of a file server machine.

FIG. 5 illustrates a configuration of the file server machine 30.

The file server machine 30 is a general-purpose computer to which a file server function that will be mentioned later on is added. Hence, the file server machine 30 includes a communication unit 30a, a storage unit 30b, a CPU 30c, and a main memory unit 30d. The respective units 30a-30d are units exhibiting functions equal to those of the user machine 10.

The storage unit 30b of the file server machine 30 is stored with operating system (OS) software 31. The OS software 31 is software exhibiting the same function as that of the user machine 10 and includes a communication interface program 31a.

Further, the storage unit 30b of the file server machine 30 is stored with a file transmission program 32. The file transmission program 32 is a program for transmitting, when requests for files are given based on a predetermined communication protocol from other computers connecting with the second network N2 and the third network N3, the designated files to those computers. Note that the predetermined communication protocol is exemplified such as FTP [File Transfer Protocol].

Moreover, the storage unit 30b of the file server machine 30 is stored with parts 33. The parts 33 are defined as texts described in a markup language by way of part of Web page data for displaying the contents.

FIGS. 6 through 8 illustrate examples of the parts 33.

The parts 33 are the texts of which document-oriented definitions and header fields of the Web page data are described in the markup language, and [$HEADER.TXT] is given as a file name. Note that the parts 33 exemplified in FIG. 6 are created so that the document-oriented definitions and the header fields are common to whichever Web page data provided to the user machine 10 by the Web server machine 20 in the embodiment.

The parts 33 illustrated in FIG. 7 are the texts in which a substance of the body of the Web page data is described in the markup language, and [$CAMPAIGN01.TXT] is given as a file name. Note that the parts 33 exemplified in FIG. 7 are created as part of data for displaying contents corresponding to one of a plurality of campaign advertisements.

The parts 33 illustrated in FIG. 8 are the texts in which a second half of the body of the Web page data is described in the markup language, and [$FOOTER.TXT] is given as a file name. It is to be noted that the parts 33 exemplified in FIG. 8 are created so that a footer field is common to whichever Web page data provided to the user machine 10 by the Web server machine 20 in the embodiment.

Further, the storage unit 30b of the file server machine 30 is stored with a parts management table 34.

FIG. 9 illustrates a schematic diagram of the parts management table 34.

The parts management table 34 is a table for recording items of information on the parts 33. As illustrated in FIG. 9, each record in the parts management table 34 has fields such as a [parts code], a [parts name], a [storage location], and an [output character]. The [parts code] field is a field recorded with a parts code defined as identifying information for specifying the parts 33. The [parts name] field is a field recorded with a name of the parts 33. The [storage location] field is a field recorded with a piece of storage location information for specifying a location where the parts 33 are stored. Incidentally, the storage location information is exemplified by, e.g., a combination of a path name and the file name. The [output character] field is a field recorded, if parts are not the texts described in the markup language as in the case of the parts 33 but a simple string of characters, with this string of characters. When the [output character] field is recorded with the string of characters, the [storage location] field is blanked.

Further, the storage unit 30b of the file server machine 30 is stored with a stock management table 35.

Figure 10:
FIG. 10 illustrates a schematic diagram of a stock management table.

FIG. 10 illustrates a schematic diagram of the stock management table 35.

The stock management table 35 is a table for recording an in-stock count of commercial products about which a campaign advertisement is described in the contents. As illustrated in FIG. 10, each record of the stock management table 35 has fields such as a [model number] and an [in-stock count]. The [model number] field is a field recorded with a model number of the commercial product. The [in-stock count] field is a field recorded with an in-stock count of the commercial products. Note that the in-stock count recorded in the [in-stock count] field is designed so that when a transaction of the commercial products is completely settled with the user through an unillustrated settlement function, the number of the sold products is subtracted from the in-stock count.

Figure 11:
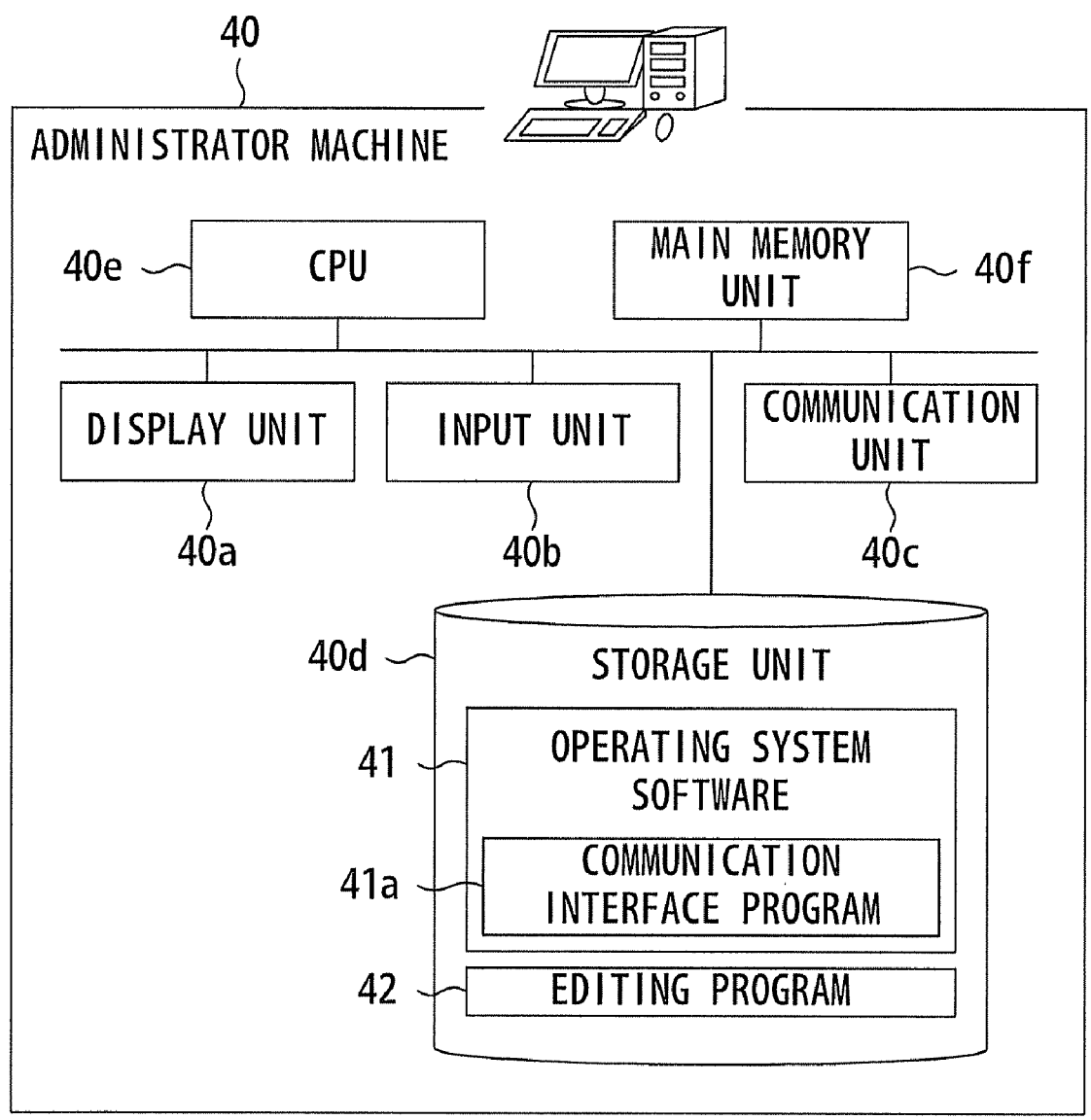
FIG. 11 illustrates a configuration of an administrator machine.

FIG. 11 illustrates a configuration of the administrator machine 40.

The administrator machine 40 is a personal computer to which a function of editing the contents and the parts 33 described above is added for the administrator who maintains a Web site configured by the Web server machine 20. Accordingly, the administrator machine 40 includes a display unit 40a, an input unit 40b, a communication unit 40c, a storage unit 40d, a CPU 40e, and a main memory unit 40f. The respective units 40a-40f are the units exhibiting the same functions as those of the user machine 10.

The storage unit 40d of the administrator machine 40 is stored with operating system (OS) software 41. The OS software 41 is the software exhibiting the same function as that of the user machine 10 and contains a communication interface program 41a.

Further, the storage unit 40d of the administrator machine 40 is stored with an editing program 42. The editing program 42 is a software component for adding the function of editing the contents and the parts 33 described above to the computer. Details of processes executed by the CPU 40e according to the editing program 42 will be described later on with reference to FIGS. 12 through 17.

<Process>>
<Edit>

When the administrator operates the input unit 40b of the administrator machine 40 and thus gives an instruction of executing the editing program 42, the CPU 40e reads the editing program 42 from the storage unit 40d and starts an edit process.

Figure 12:
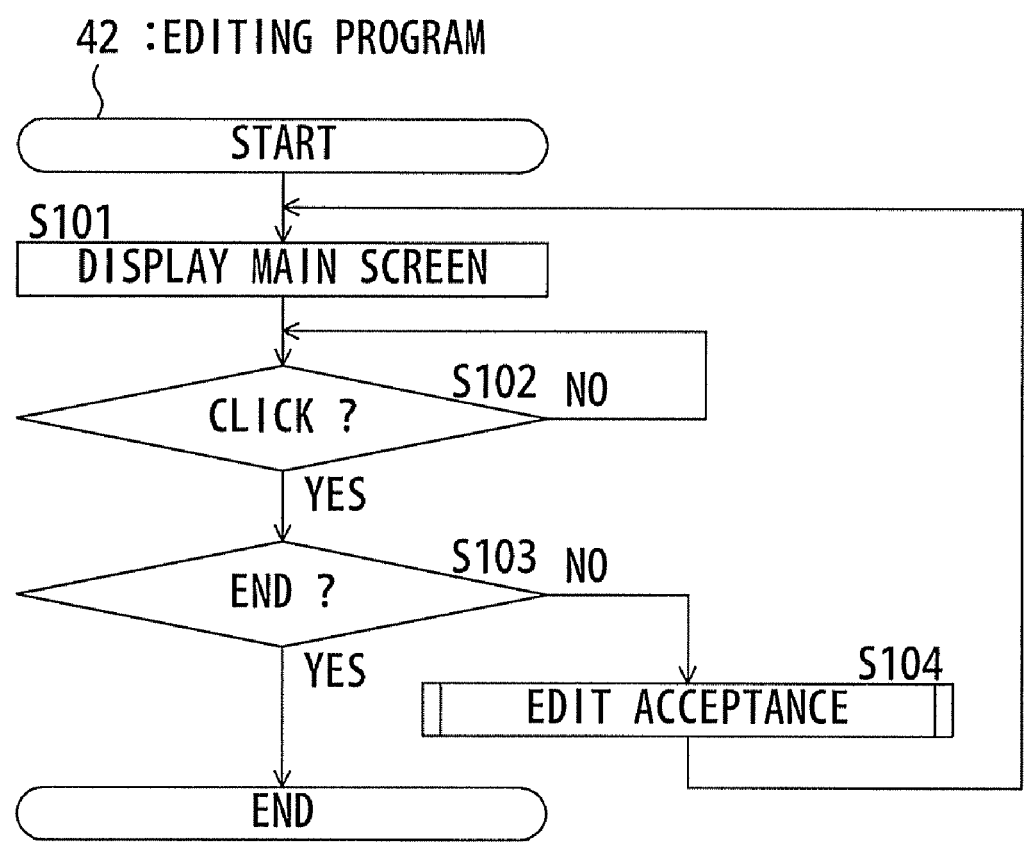
FIG. 12 illustrates a flow of an edit process.

FIG. 12 illustrates a flow of the edit process.

In first step S101 after starting the edit process, the CPU 40e displays a main screen on the display unit 40a.

Figure 13:
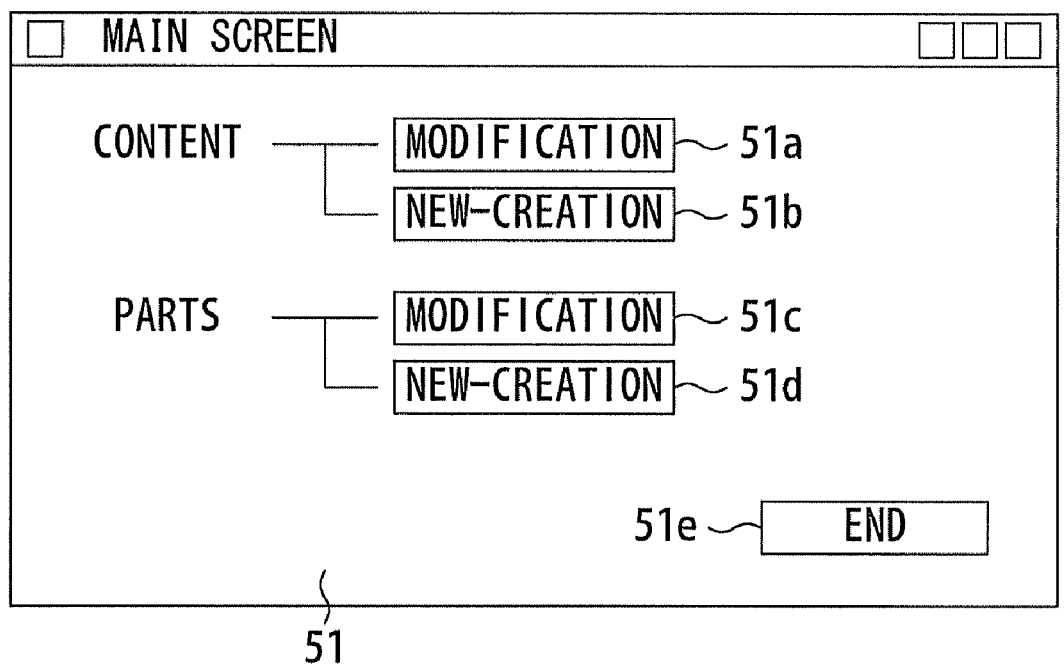
FIG. 13 illustrates one example of a main screen.

FIG. 13 illustrates one example of a main screen 51.

The main screen 51 exemplified in FIG. 13 contains five buttons 51a-51e. The first button 51a is a content modification button which is clicked by the administrator who tries to modify the information on the contents registered in the content management table 24 (see FIG. 4) in the Web server machine 20. The second button 51b is a content new-creation button which is clicked by the administrator who tries to newly register the information on the contents in the content management table 24. The third button 51c is a parts modification button which is clicked by the administrator who tries to modify the information on the parts 33 registered in the parts management table 34 within the file server machine 30. The fourth button 51d is a parts new-creation button which is clicked by the administrator who tries to newly generate the parts 33. The fifth button 51e is an end button which is clicked by the administrator who tries to finish the edit process in FIG. 12.

The CPU 40e, after displaying the main screen 51 exemplified in FIG. 13 on the display unit 40a, advances the processing to step S102.

In step S102, the CPU 40e stands by till any one of the five buttons on the main screen 51 is clicked. Then, when any one of the buttons is clicked, the CPU 40e advances the processing to step S103.

In step S103, the CPU 40e determines whether or not the button with its click being detected in step S102 is the end button 51e. Then, if the button with its click being detected in step S102 is the end button 51e, the CPU 40e terminates the edit process in FIG. 12. Whereas if the button with its click being detected in step S102 is the button other than the end button 51e, the CPU 40e diverts the processing to step S104 from step S103.

In step S104, the CPU 40e executes an edit acceptance subroutine.

Figure 14A:
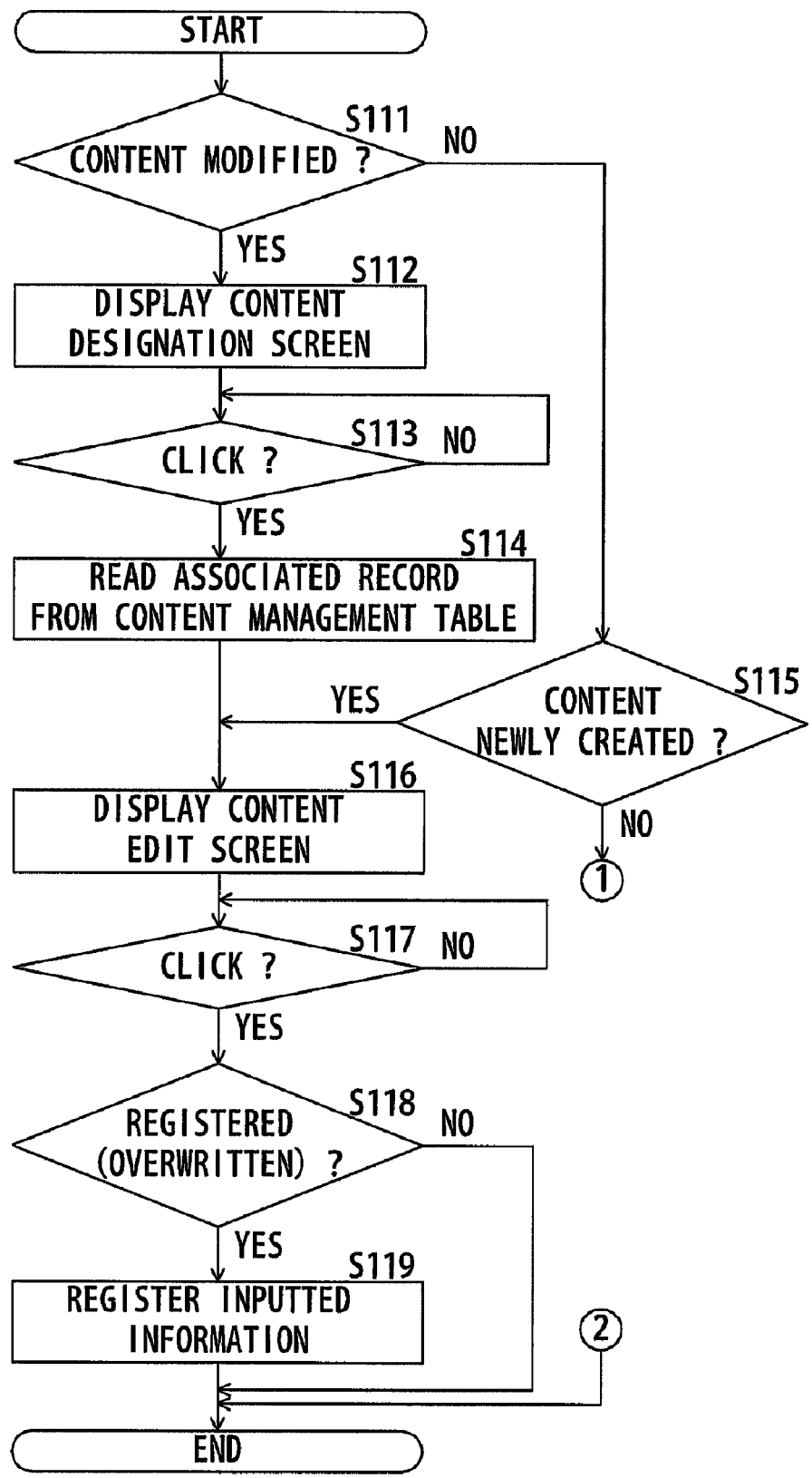
FIGS. 14A and 14B illustrate a flow of an edit acceptance subroutine.
Figure 14B:
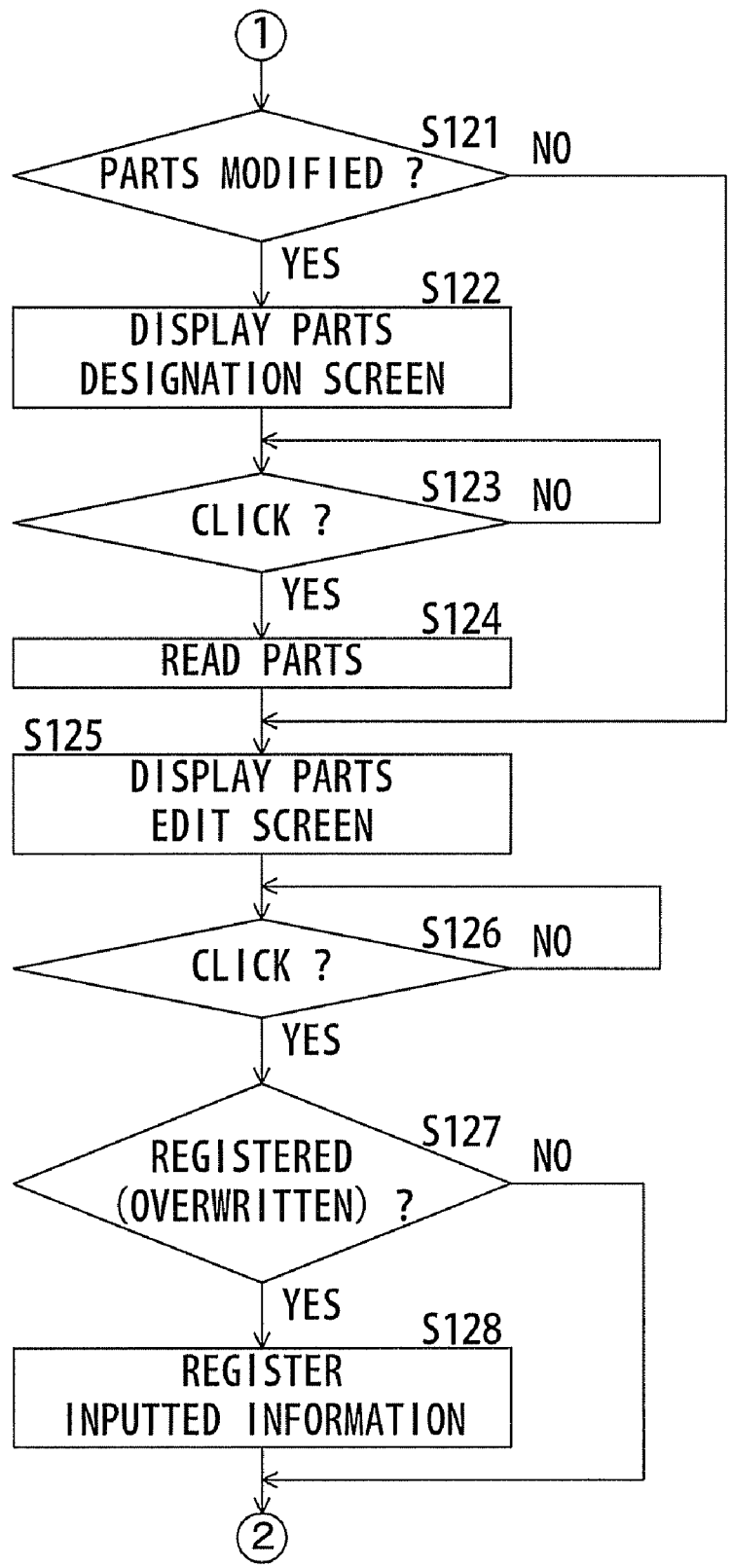

FIGS. 14A and 14B illustrate a flow of the edit acceptance subroutine.

After starting the edit acceptance subroutine, in first step S111, the CPU 40e determines whether or not the button with its click being detected in step S102 is the content modification button 51. Then, if the button with its click being detected in step S102 is the content modification button 51a, the CPU 40e advances the processing to step S112.

In step S112, the CPU 40e displays a content designation screen on the display unit 40a. The content designation screen contains, though not illustrated, a drop-down list box having a function of displaying a list box in which the content names registered in the content management table 24 (see FIG. 4) within the Web server machine 20 are listed up, and a determination button for determining the content name inputted to the drop-down list box as a designation target content name. The content designation screen may also be, however, a screen listing up the content names detected from the content management table 24 with all of the content names or the model numbers or some thereof serving as search conditions and containing a selection means such as a button for designating any one of the listed-up content names. In the latter case, however, it follows that before the content designation screen is displayed on the display unit 40a, a search condition input screen is displayed on the display unit 40a. The search condition input screen contains an input box such as a text box to which all of the content names or the model numbers or some thereof are inputted and an execution button used for the Web server machine 20 to search the content management table 24 with the string of characters inputted to the input box serving as the search conditions.

In next step S113, the CPU 40e stands by till the unillustrated determination button on the content designation screen is clicked. Then, when the determination button is clicked, the CPU 40e advances the processing to step S114.

In step S114, the CPU 40e reads, from the content management table 24, a record associated with the content name inputted to the drop-down list box when the determination button is clicked. Thereafter, the CPU 40e advances the processing to step S116.

On the other hand, if the button with its click being detected in step S102 in FIG. 12 is not the content modification button 51a, the CPU 40e diverts the processing to step S115 from step S111.

In step S115, the CPU 40e determines whether or not the button with its click being detected in step S102 is the content new-creation button 51b. Then, if the button with its click being detected in step S102 is the content new-creation button 51b, the CPU 40e diverts the processing to step S116 from step S115.

In step S116, the CPU 40e displays the content edit screen on the display unit 40a.

FIG. 15 illustrates one example of the content edit screen 52.

The content edit screen 52 exemplified in FIG. 15 contains eight pieces of text boxes 52a-52h, a pair of radio buttons 52i, 52i, and two pieces of buttons 52j, 52k. The eight text boxes 52a-52h are input boxes to which a content code, a content name, a parts name, a model number, a URL (Uniform Resource Locator) of the content, a start date/time and an end date/time of a public viewing period of the content, and a URL of a substitute page are respectively inputted. The two radio buttons 52i, 52i are the selection means for selecting a status of a sold-out flag about the content. The first button of the two buttons 52i, 52k is a registration (overwriting) button which is clicked by the administrator who tries to register (overwrite) the information inputted to the eight text boxes 52a-52h and any one of the pair of radio buttons 52i, 52i into the content management table 24. The second button 52k is a stop button which is clicked by the administrator who tries to stop editing the content.

Note that when executing step S116 via step S115, the CPU 40e displays the content edit screen 52 on the display unit 40a in a state of blanking the eight text boxes 52a-52h.

Conversely, when executing step S116 via step S114, the CPU 40e displays the content edit screen 52 on the display unit 40a in a state of inputting the information contained in the record read out in step S114 to the eight text boxes 52a-52h and a corresponding piece of radio button of the pair of radio buttons 52i, 52i.

In next step S117, the CPU 40e stands by till any one of the two buttons 52j, 52k on the content edit screen 52 is clicked. Then, when any one of these buttons is clicked, the CPU 40e advances the processing to step S118.

In step S118, the CPU 40e determines whether or not the button with its click being detected in step S117 is the registration (overwriting) button 52j. Then, if the button with its click being detected in step S117 is not the registration (overwriting) button 52j (i.e., when the clicked button is the stop button 52k), the CPU 40e diverts the processing from step S118, terminates the edit acceptance subroutine in FIGS. 14A and 14B, then loops the processing back to step S101 in FIG. 12, and displays the main screen 51 on the display unit 40a. While on the other hand, if the button with its click being detected in step S117 is the registration (overwriting) button 52j, the CPU 40e advances the processing to step S119.

In step S119, the CPU 40e registers, into the content management table 24 within the Web server machine 20, the information inputted to the eight text boxes 52a-52h and any one of the pair of radio buttons 52i, 52i when clicking the registration (overwriting) button 52j. Herein, if the record containing the same content name exists in the content management table 24, the CPU 40e overwrites the information concerned to this record. Conversely, if none of the record containing the same content name exists in the content management table 24, the CPU 40e adds the information as a new record to the content management table 24. After executing this sort of registration process, the CPU 40e terminates the edit acceptance subroutine in FIGS. 14A and 14B, then loops the processing back to step S101 in FIG. 12, and displays the main screen 51 on the display unit 40a.

On the other hand, in step S115 in FIG. 14A, if the button with its click being detected in step S102 in FIG. 12 is not the content new-creation button 51b, the CPU 40e advances the processing to step S121 in FIG. 14B.

In step S121, the CPU 40e determines whether or not the button with its click being detected in step S102 in FIG. 12 is the parts modification button 51c (see FIG. 13). Then, if the button with its click being detected in step S102 in FIG. 12 is the parts modification button 51c, the CPU 40e advances the processing to step S122.

In step S122, the CPU 40e displays a parts designation screen on the display unit 40a. The parts designation screen contains, though not illustrated, a drop-down list box having a function of displaying a list box in which the parts names registered in the parts management table 34 (see FIG. 9) within the file server machine 30 are listed up, and a determination button for determining the parts name inputted to the drop-down list box as a designation target parts name. The parts designation screen may also be, however, a screen listing up the parts names detected from the parts management table 34 with all of the parts names or some thereof serving as search conditions and containing a selection means such as a button for designating any one of the listed-up parts names. In the latter case, however, it follows that before the parts designation screen is displayed on the display unit 40a, a search condition input screen is displayed on the display unit 40a. The search condition input screen contains an input box such as a text box to which all of the parts names or some thereof are inputted and an execution button used for the file server machine 30 to search the parts management table 34 with the string of characters inputted to the input box serving as the search conditions.

In next step S123, the CPU 40e stands by till the unillustrated determination button on the parts designation screen is clicked. Then, when the determination button is clicked, the CPU 40e advances the processing to step S124.

In step S124, the CPU 40e reads, from the parts management table 34, a record associated with the parts name inputted to the drop-down list box when the determination button is clicked, and further, if the storage location information is contained in the readout record, reads the parts 33 from the storage location specified by the storage location information. Thereafter, the CPU 40e advances the processing to step S125.

On the other hand, if the button with its click being detected in step S102 in FIG. 12 is not the parts modification button 51c (i.e., the clicked button is the parts new-creation button 51d), the CPU 40e diverts the processing to step S125 from step S121.

In step S125, the CPU 40e displays a parts edit screen on the display unit 40a.

Figure 16:
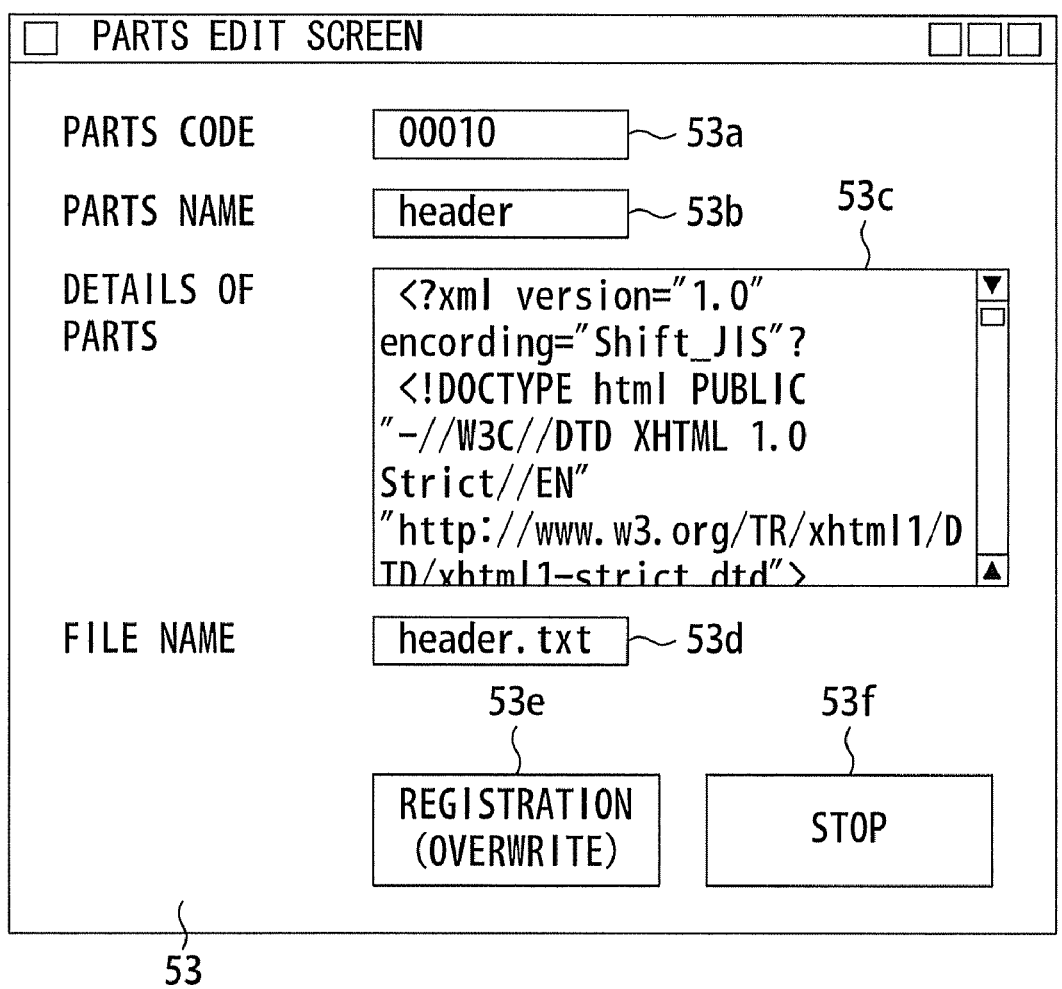
FIG. 16 illustrates one example of a parts edit screen.

FIG. 16 illustrates one example of a parts edit screen 53.

The parts edit screen 53 exemplified in FIG. 16 contains four pieces of text boxes 53a-53d and two pieces of buttons 53e, 53f. The four text boxes 53a-53d are input boxes to which a parts code, a parts name, a text, and a file name are respectively inputted. The first button of the two buttons 53e, 53f is a registration (overwriting) button which is clicked by the administrator who tries to store the text inputted to the third text box 53c as the parts 33 and to register (overwrite) the information inputted to the three remaining text boxes 53a, 53b, 53d into the parts management table 34. The second button 53f is a stop button which is clicked by the administrator who tries to stop editing the parts.

Note that when executing step S125 without via step S124, the CPU 40e displays the parts edit screen 53 on the display unit 40a in a state of blanking the four text boxes 53a-53d.

Conversely when executing step S125 via step S124, the CPU 40e displays the parts edit screen 53 on the display unit 40a in a state of inputting the information contained in the record read out in step S124 and the parts 33 to the four text boxes 53a-53d. If the record read out in step S124 contains none of the storage location information, the CPU 40e displays the parts edit screen 53 on the display unit 40a in a state of blanking the fourth text box 53d and inputting the string of characters in the [output character] field of the record to the third text box 53c.

In next step S126, the CPU 40e stands by till any one of the two buttons 53e, 53f on the parts edit screen 53 is clicked. Then, when any one of the buttons is clicked, the CPU 40e advances the processing to step S127.

In step S127, the CPU 40e determines whether or not the button with its click being detected in step S126 is the registration (overwriting) button 53e. Then, if the button with its click being detected in step S126 is not the registration (overwriting) button 53e (i.e., the clicked button is the stop button 53f), the CPU 40e diverts the processing from step S127, terminates the edit acceptance subroutine in FIGS. 14A and 14B, then loops the processing back to step S101 in FIG. 12, and displays the main screen 51 on the display unit 40a. Whereas if the button with its click being detected in step S126 is the registration (overwriting) button 53e, the CPU 40e advances the processing to step S128.

In step S128, the CPU 40e registers, into the parts management table 34 within the file server machine 30, the information inputted to the three text boxes 53a, 53b, 53d when the registration (overwriting) button 53e is clicked. Herein, if the record containing the same parts name exists in the parts management table 34, the CPU 40e overwrites the information concerned to this record. Conversely, if none of the record containing the same parts name exists in the parts management table 34, the CPU 40e adds the information as a new record to the parts management table 34. Further, if tags pursuant to the markup language are contained in the third text box 53c when the registration (overwriting) button 53e is clicked, the CPU 40e stores the text contained in the third text box 53c as the parts 33 in the file server machine 30. Reversely, if the tags pursuant to the markup language are not contained in the third text box 53c when the registration (overwriting) button 53e is clicked, the CPU 40e stores the text contained in the third text box 53c in the [output character] field of the record registered in the parts management table 34, and blanks the [storage location] field of the same record. After executing this sort of registration process, the CPU 40e finishes the edit acceptance subroutine in FIGS. 14A and 14B, loops the processing back to step S101 in FIG. 12, and displays the main screen 51 on the display unit 40a.

<Display>

A scheme in the Web server machine 20 is that upon switching ON a main power source, the CPU 20c reads a Web server program 23 from the storage unit 20b and starts a Web server process.

Figure 17:
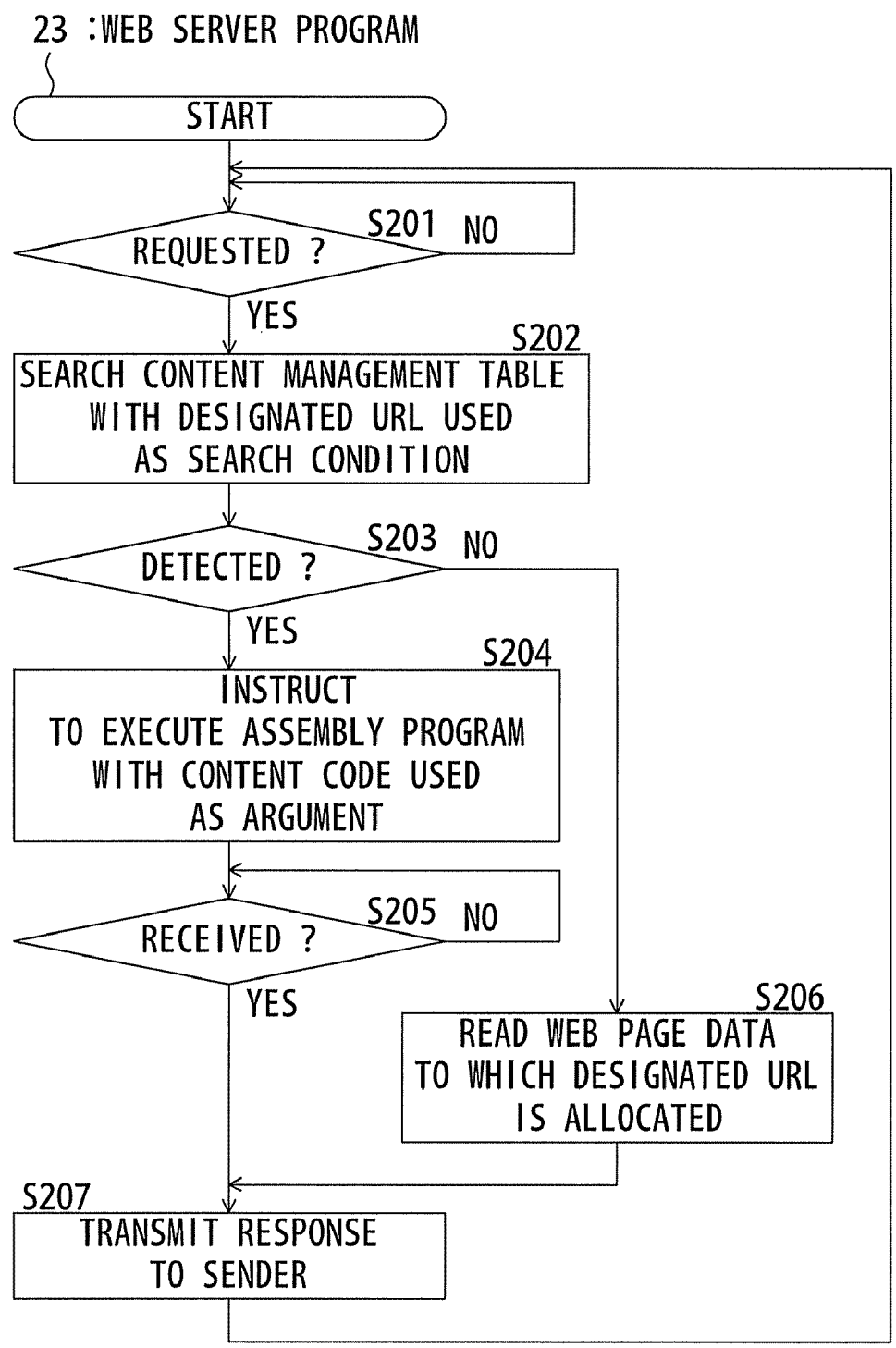
FIG. 17 illustrates a flow of a Web server process.

FIG. 17 illustrates a flow of the Web server process.

After starting the Web server process, in first step S201, the CPU 20c stands by till a request message is received from any one of the user machines 10. Then, when receiving the request message from any one of the user machines 10, the CPU 20c advances the processing to step S202.

In step S202, the CPU 20c searches the content management table 24 by use of the URL as a search condition, which is designated in the request message of which the reception is detected in step S201.

In next step S203, the CPU 20c determines whether or not any record is detected as a result of the search in step S202. Then, if the record is detected, the CPU 20c advances the processing to step S204.

In step S204, the CPU 20c gives an instruction of executing the assembly program 25 in a way that uses the content code, as an argument, contained in the record detected through the search in step S202. Note that details of a process related to the assembly program 25 will be described later on.

In step S205, the CPU 20c stands by till the Web page data is received as a return value from the assembly program 25 of which the execution has been instructed in step S204. Then, when receiving the Web page data from the assembly program 25, the CPU 20c advances the processing to step S207.

While on the other hand, as a result of the search in step S202, if any record is not detected, the CPU 20c diverts the processing to step S206 from step S203.

In step S206, the CPU 20c reads the Web page data 22 to which the URL designated in the request message with its reception being detected in step S201 is allocated. Thereafter, the CPU 20c advances the processing to step S207.

In step S207, the CPU 20c generates a response message of which a body contains the Web page data received from the assembly program 25 in step S205 or the Web page data 22 read out in step S206, and transmits the thus-generated response message to the user machine 10 that sends the request message. Thereafter, the CPU 20c loops the processing back to step S201 and returns to the standby status till the request message is received from the any one of the user machines 10.

<Assembly>

The CPU 20c is configured to read, as triggered by executing step S204 of the Web server process in FIG. 17, the assembly program 25 from the storage unit 20b and to start an assembly process.

Figure 18:
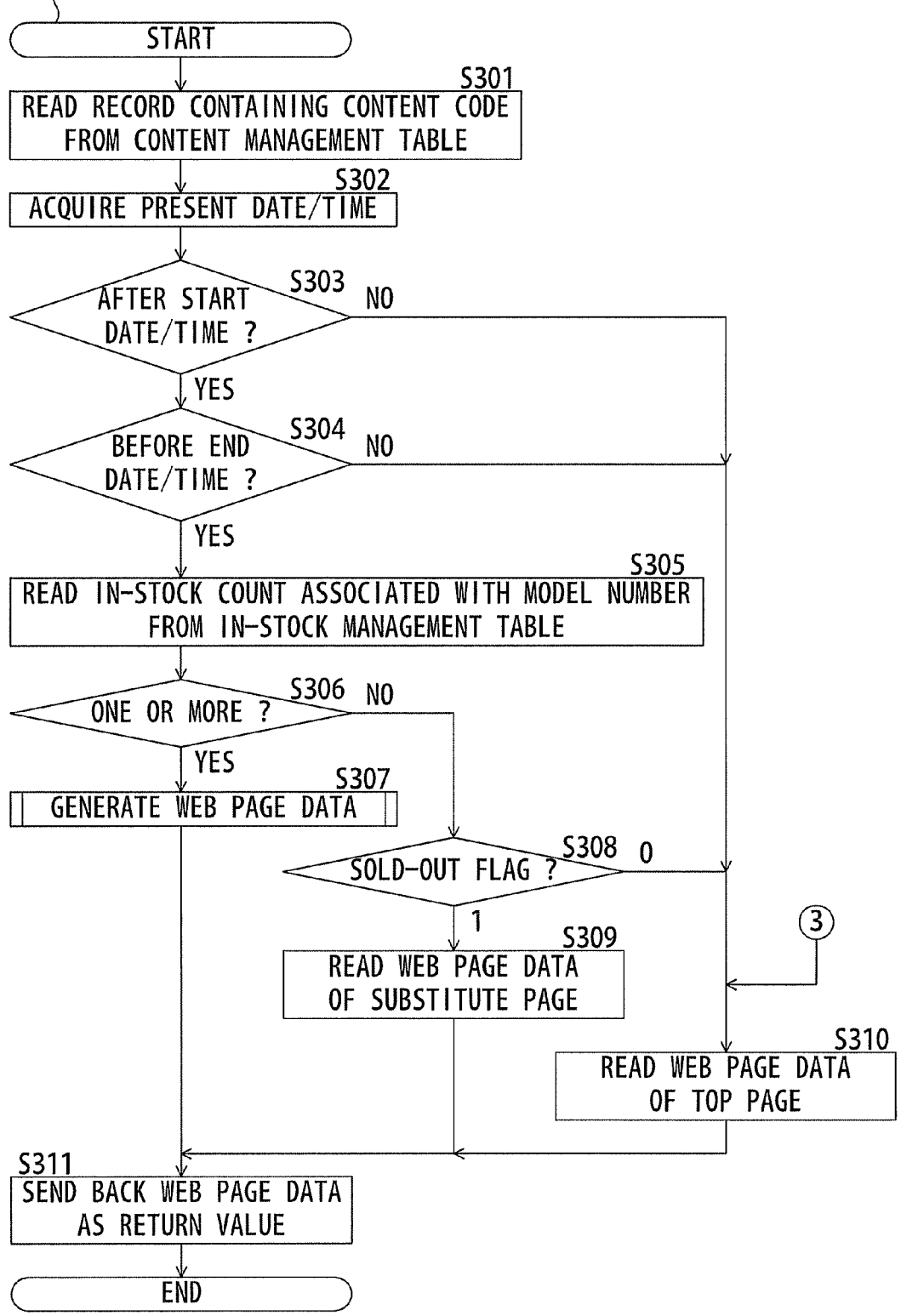
FIG. 18 illustrates a flow of an assembly process.

FIG. 18 illustrates a flow of the assembly process.

After starting the assembly process, in first step S301, the CPU 20c reads a record containing the content code given as the argument from the content management table 24 (see FIG. 4).

Note that the CPU 20c executing steps S201 through S204 and step S301 corresponds to the first reading unit described above.

In next step S302, the CPU 20c acquires a date/time (year/month/date/hour/minute) at that point of time.

In next step S303, the CPU 20c determines whether or not the present date/time acquired in step S302 is posterior to a value (start date/time) registered in the [start date/time] field of the record read out in step S301. Then, if the present date/time is anterior to the start date/time, the CPU 20c diverts the processing to step S310 from step S303. Whereas if the present date/time is posterior to the start date/time, the CPU 20c advances the processing to step S304 from step S303. Note that the CPU 20c advances the processing to step S304 also when the [start date/time] field of the record read out in step S301 is blank.

In step S304, the CPU 20c determines whether or not the present date/time acquired in step S302 is anterior to a value (end date/time) registered in the [end date/time] field of the record read out in step S301. Then, if the present date/time is posterior to the end date/time, the CPU 20c diverts the processing to step S310 from step S304. Whereas if the present date/time is anterior to the end date/time, the CPU 20c advances the processing to step S305 from step S304. Note that the CPU 20c advances the processing to step S305 also when the [end data] field of the record read out in step S301 is blank.

In step S305, the CPU 20c reads an in-stock count associated with the value (model number) registered in the [model number] field of the record read out in step S301 from the in-stock management table 35 (see FIG. 10) within the file server machine 30.

In step S306, the CPU 20c determines whether the in-stock count read out in step S305 is equal to or larger than "1" or not. Then, if the in-stock count is equal to or larger than "1", the CPU 20c advances the processing to step S307.

In step S307, the CPU 20c executes a Web page data generation subroutine.

Figure 19:
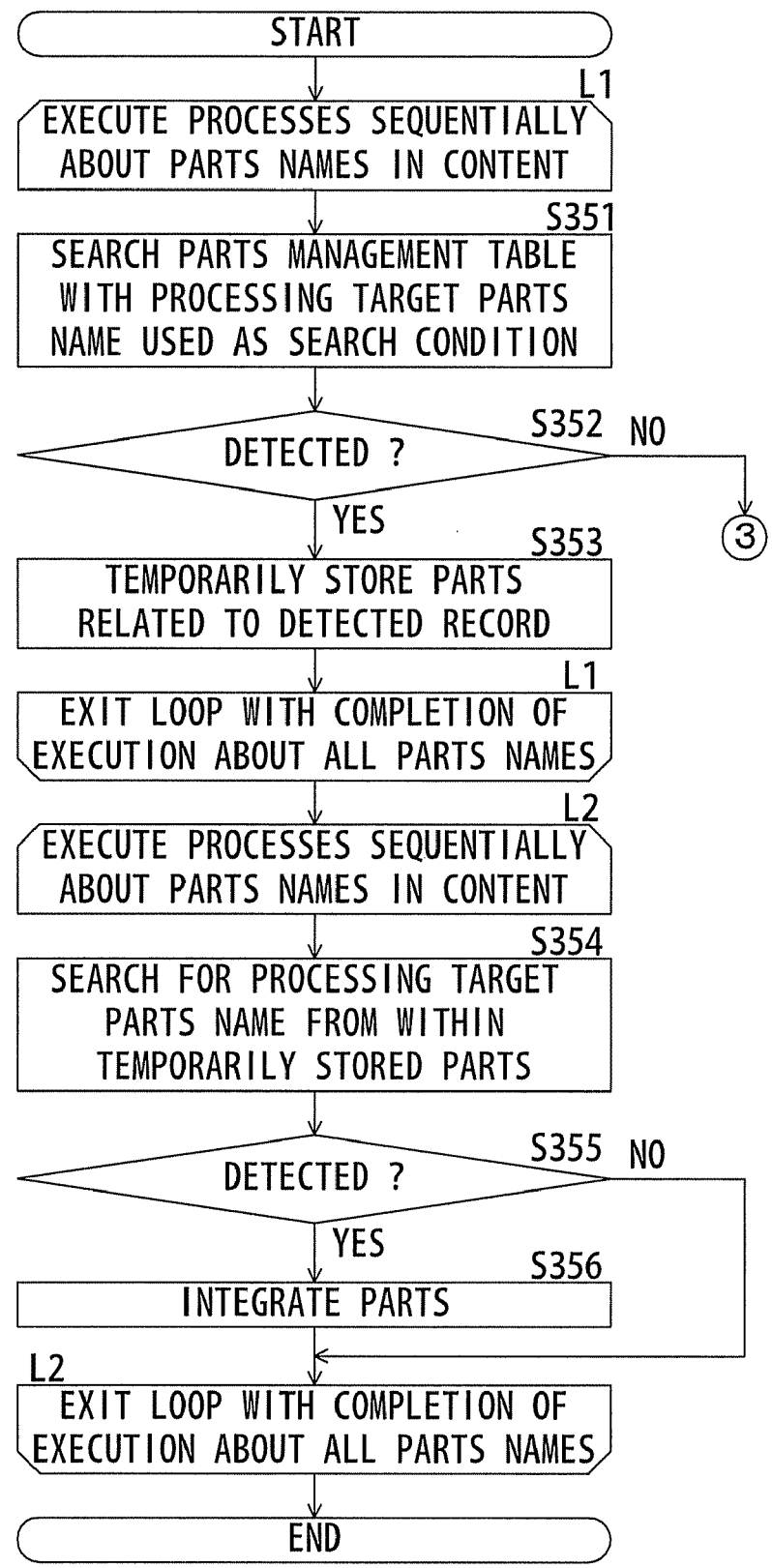
FIG. 19 illustrates a flow of a Web page data generation subroutine.

FIG. 19 illustrates a flow of the Web page data generation subroutine.

After starting the Web page data generation subroutine, the CPU 20c executes a first processing loop L1.

In the first processing loop L1, the CPU 20c sequentially executes steps S351 through S353 with respect to values (parts names) given in the [content] field of the record read out in step S301.

In step S351, the CPU 20c searches the parts management table 34 (see FIG. 9) within the file server machine 30 in a way that uses the processing target parts name as a search condition.

In next step S352, the CPU 20c determines whether any record is detected or not as a result of the search in step S351. Then, if the record can not be detected, the CPU 20c exits the first processing loop L1 and the Web page data generation subroutine in FIG. 19 by diverting the processing from step S352, and advances the processing to step S310 in FIG. 18.

While on the other hand, if the record can be detected, the CPU 20c advances the processing to step S353.

In step S353, the CPU 20c reads the parts 33 from the storage unit 20b on the basis of the value (storage location information) in the [storage location] field of the record searched in step S301, and temporarily stores the parts 33 as the Web page data in the main memory unit 20d. At this time, the CPU 20c, if there exist the parts 33 already stored as the Web page data in the main memory unit 20d, stores the readout parts 33 as an addition posterior to the already-existing parts 33. Thereafter, the CPU 20c finishes this turn for the processing target parts in the first processing loop L1.

It is to be noted that the CPU 20c executing steps S302 through S307 and steps S351 through S353 corresponds to the second reading unit described above.

The CPU 20c, after finishing executing steps S351 through S353 with respect to all of the values (parts names) registered in the [content] field of the record read out in step S301, exits the first processing loop L1 and executes a second processing loop L2.

In the second processing loop L2, the CPU 20c sequentially executes steps S354 through S356 with respect to each of the values (parts names) in the [content] field of the record read out in step S301.

In step S354, the CPU 20c searches for the parts name of the processing target parts from within the parts 33 temporarily stored as the Web page data in the main memory unit 20d in step S353.

In next step S355, the CPU 20c determines whether or not the parts name of the processing target parts can be detected from within the parts 33 temporarily stored as the Web page data in the main memory unit 20d in step S353. Then, if the parts name of the processing target parts can not be detected from within the parts 33 temporarily stored as the Web page data in the main memory unit 20d in step S353, the CPU 20c diverts the processing from step S355, and terminates the turn for the processing target parts in the second processing loop L2. Whereas if the parts name of the processing target parts can be detected from within the parts 33 temporarily stored as the Web page data in the main memory unit 20d in step S353, the CPU 20c advances the processing to step S356.

In step S356, the CPU 20c integrates the parts 33. To be specific, the CPU 20c deletes the parts 33 associated with the processing target parts name from the main memory unit 20d, and replaces the processing target parts name in the parts 33 temporarily stored as the Web page data in the main memory unit 20d in step S353 with the parts 33 associated with this processing target parts name. Herein, if the parts 33 associated with the processing target parts name does not exist in the main memory unit 20d, the CPU 20c replaces the processing target parts name in the parts 33 read out to the main memory unit 20d in step S353 with the value (string of characters) in the [output character] field of the record that is detected through the search in step S351. In the way described above, after integrating the parts 33, the CPU 20c finishes this turn for the processing target parts in the second processing loop L2.

It is to be noted that the CPU 20c executing steps S353 through S356 corresponds to the generating unit described above.

The CPU 20c, after finishing executing steps S354 through S356 with respect to all of the values (parts names) registered in the [content] field of the record read out in step S301, terminates the Web page data generation subroutine in FIG. 19 by exiting the second processing loop L2, and advances the processing to step S311 in FIG. 18.

On the other hand, if the in-stock count read out in step S305 is "0", the CPU 20c diverts the processing to step S308 from step S306.

In step S308, the CPU 20c determines whether the value in the [sold-out flag] field of the record read out in step S301 is [1] or [0]. Then, if the value in the [sold-out flag] field of the record read out in step S301 is [1], the CPU 20c advances the processing to step S309.

In step S309, the CPU 20c reads, from the storage unit 20b, the Web page data 22 to which the value (URL) in the [sold-out flag] field of the record read out in step S301 is allocated, and temporarily stores the Web page data 22 in the main memory unit 20d. Thereafter, the CPU 20c advances the processing to step S311.

On the other hand, if the value in the [sold-out flag] field of the record read out in step S301 is [0], the CPU 20c diverts the processing to step S310 from step S308.

In step S310, the CPU 20c reads the Web page data 22 of the top page from the storage unit 20b, and temporarily stores the Web page data 22 in the main memory unit 20d. Thereafter, the CPU 20c advances the processing to step S311.

In step S311, the CPU 20c returns the Web page data temporarily stored in the main memory unit 20d at this point of time as a return value to the Web server process. Thereafter, the CPU 20c finishes the assembly process in FIG. 18.

It is to be noted that the CPU 20c executing step S311 and step S207 corresponds to the transmitting unit described above.

<<Operation and Effect>>

According to the embodiment, the Web server machine 20, when the content including the description of the campaign advertisement is requested by any one of the user machines 10 (step S201), reads the parts names as the structure (element) of the Web page data for displaying the content from the content management table 24 (steps S202 through S204, step S301), acquires the parts 33 specified by the parts name from the file server machine 30, generates the Web page data by combining the acquired parts 33 (step S307, steps S351 through S353), and sends the generated Web page data as a response to the user machine 10 (steps S311, S205, S207).

The Web server machine 20 operates in the way described above, and hence, if the parts name associated with the URL of the content changes in the content management table 24, it follows that the content displayed on the user machine 10 changes. For example, in the record specified by the content code [00010] in the content management table 24 in FIG. 4, if a combination of the parts names changes from [$HEADER, $CAMPAIGN01, $FOOTER, $FMVCE100_IMG, $FMVCE100_KAKAKU] to [$HEADER, $CAMPAIGN02, $FOOTER, $FMVCE100_IMG, $FMVCE100_KAKAKU], it follows that the content displayed on the user machine 10 changes.

Further, in the embodiment, the content can be generated by combining the parts names (steps S101, S102, S103; N0, S104, S111; N0, S115; YES, S116 through S119). Accordingly, the administrator, even if not versed in the markup language, can simply generate the Web page data.

Further, in the embodiment, the parts 33 (having the parts name [$HEADER]) in FIG. 6 that is given a file name [$HEADER.TXT] and the parts 33 (having the parts name [$FOOTER]) in FIG. 8 that is given a file name [$FOOTER.TXT] are generated as common elements to every piece of Web page data provided to the user machines 10 by the Web server machine 20 according to the embodiment. On the Web site such as the direct selling site, the common elements are created in every page in many cases, however, according to the embodiment, the common elements to all of the Web pages configuring the Web site can be created uniformly such as [$HEADER] and [$FOOTER]. Moreover, even when the common elements need modifying, the common elements to all of the Web pages configuring the Web site can be modified uniformly by editing the parts 33 of [$HEADER] and [$FOOTER] (step S101, S102, S103; N0, S104, S111; N0, S115; N0, S121; YES, S122 through S128). With this scheme, an operation of modifying the Web page data and uploading the data to the Web server is not required for all of the Web page data.

Further, in the embodiment, the parts name [$FMVCE100_IMG] and the parts name [$FMVCE100_KAKAKU] are described in the parts 33 (having a parts name [$CAMPAIGN01]) in FIG. 7 that is given a file name [$CAMPAIGN01.TXT], in which the parts 33 (having a file name [FMVCE100.img] associated with [$FMVCE100_IMG] is incorporated (registered) in the area (record) containing the description of [$FMVCE100_IMG] in the parts 33 of [$CAMPAIGN01] and the character string (see FIG. 9) of [¥10,000] is incorporated (registered) in the area (record) containing the description of [$FMVCE100_KAKU] in the second processing loop L2 in FIG. 19. Therefore, the administrator changes the parts 33 associated with [$FMVCE100_IMG] into different image data and changes the string of characters associated with [$FMVCE100_KAKAKU] to [¥9,800] from [¥10,000] by use of the editing program 42 of the administrator machine 40, whereby some elements of the data associated with the parts of [$CAMPAIGN01] in the content specified by the content code [00010] can be properly changed.

Moreover, in the embodiment, if the public viewing period of the content is defined, as to the user machines 10, the content is displayed on the user machine 10 having an access within the public viewing period (steps S201 through S204, S304; YES, S305; YES, S307, S311, S205, S207), and the top page is displayed on the user machine 10 having the access beyond this period (steps S201 through S204, S303; YES, S304; N0, S310, S311, S205, S207). Therefore, the campaign can be conducted corresponding to a time of year and a time zone.

Further, in the embodiment, even when within the public viewing period of the content and if there is no stock of the commercial products related to the campaign, the display of the content is stopped (steps S201 through S204, S305, S306; NO, steps S308 through S311, S205, S207). It does not therefore happen that the user might fall into a situation where the user was prompted by the campaign in the public viewing and was nevertheless unable to obtain the commercial product due to no stock. As a result, the administrator of the Web site can avoid giving an uncomfortable feeling to the user.

<<Explanation about Unit>>

In the embodiment discussed above, the respective units 10*a*-10*f* in the user machine 10, the units 20*a*-20*d* in the Web server machine 20, the units 30*a*-30*d* in the file server machine 30, and the units 40*a*-40*f* in the administrator machine 40 may each be constructed of a software component and a hardware component and may also be constructed of only the hardware component.

The software component can be exemplified by an interface program, a driver program, a table, and data and by a combination of some of these components. These components may be stored on a computer-readable medium that will be explained later on and may also be firmware that is fixedly incorporated into a storage device such as a ROM [Read Only Memory] and an LSI [Large Scale Integration].

Moreover, the hardware component can be exemplified by an FPGA [Field Programmable Gate Array], an ASIC [Application Specific Integrated Circuit], a gate array, a combination of logic gates, a signal processing circuit, an analog circuit, and other types of circuits. Among these components, the logic gate may include an AND, an OR, a NOT, a NAND, a flip-flop, a counter circuit, and so on. Moreover, the signal processing circuit may include circuit elements which execute addition, multiplication, subtraction, inversion, a sum-of-products operation, differentiation, and integration of signal values. Further, the analog circuit may include circuit elements which execute amplification, addition, multiplication, differentiation, integration, etc.

Note that the components building up the units 10*a*-10*f* in the user machine 10, the units 20*a*-20*d* in the Web server machine 20, the units 30*a*-30*d* in the file server machine 30, and the units 40*a*-40*f* in the administrator machine 40, are not limited to those exemplified above but may be other components equivalent thereto.

<<Explanation about Software and Program>>

In the embodiment discussed above, the pieces of software 11, 12 in the user machine 10, the OS software 21, the programs 23, 25, the Web page data 22 and the content management table 24 in the Web server machine 20, the OS software 31, the file transmission program 32, the parts 33, and the tables 34, 35 in the file server machine 30, the OS software 41 and the editing program 42 of the administrator machine 40, and the software components described above, may each include elements such as a software component, a procedure-oriented language based component, an object-oriented software component, class software, a component managed as a task, a component managed as a process, as a function, an attribute, a procedure, a subroutine (software routine), a fragment or segment of a program code, a driver, firmware, a microcode, a code, a code segment, an extra segment, a stack segment, a program area, a data area, data, a database, a data structure, a field, a record, a table, a matrix table, an array, a variable, and a parameter.

Further, the pieces of software 11, 12 in the user machine 10, the OS software 21, the programs 23, 25, the Web page data 22 and the content management table 24 in the Web server machine 20, the OS software 31, the file transmission program 32, the parts 33, and the tables 34, 35 in the file server machine 30, the OS software 41 and the editing program 42 of the administrator machine 40, and the software components described above, may each be described in a C-language, C++, Java (trademark of Sun Microsystems in U.S.A.), Visualbasic (trademark of Microsoft Corp. in U.S.A.), Perl, Ruby, and other programming languages.

Moreover, the instruction, the code, and the data contained in the pieces of software 11, 12 in the user machine 10, the OS software 21, the programs 23, 25, the Web page data 22 and the content management table 24 in the Web server machine 20, the OS software 31, the file transmission program 32, the parts 33, and the tables 34, 35 in the file server machine 30, the OS software 41 and the editing program 42 of the administrator machine 40, and the software components described above, may be transmitted to or loaded into a computer or a computer embedded into a machine or a system via a wired network card and a wired network or via a wireless card and a wireless network.

In the transmission or loading described above, the data signals flow via the wired network or the wireless network in the way of their being carried on, e.g., carrier waves (subcarriers). The data signals may also be, however, transferred intact as so-called baseband signals without depending on the carrier waves described above. These carrier waves are transmitted in an electric, magnetic, or electromagnetic mode, an optical mode, an acoustic mode, or other modes.

Herein, the wired network or the wireless network is a network built up by, e.g., a telephone line, a network line, a cable (including an optical cable and a metallic cable), a wireless link, a mobile phone access line, a PHS [Personal Handyphone System] network, a wireless LAN [Local Area Network], Bluetooth (trademark of the Bluetooth Special Interest Group), on-vehicle wireless type communications (including DSRC [Dedicated Short Range Communication]), and a network constructed of any one of those given above. Then, the data signals are used for transmitting the information including the instruction, the code, and the data to a node or the component on the network.

Note that the components configuring the pieces of software 11, 12 in the user machine 10, the OS software 21, the programs 23, 25, the Web page data 22 and the content management table 24 in the Web server machine 20, the OS software 31, the file transmission program 32, the parts 33, and the tables 34, 35 in the file server machine 30, the OS software 41 and the editing program 42 of the administrator machine 40, and the software components described above, are not limited those exemplified above and may also be other components equivalent thereto.

<<Explanation about Computer-Readable Medium>>

Any one of the functions in the embodiment discussed above may be coded and thus stored in a storage area on the computer-readable medium. In this case, the program for utilizing the function can be provided to the computer or the computer embedded into the machine or the system via the computer-readable medium. The computer or the computer embedded into the machine or the system reads the program from the storage area on the computer-readable medium and executes the program, thereby enabling the function thereof to be utilized.

Herein, the computer-readable medium connotes a recording medium capable of accumulating information such as the program and the data by electrical, magnetic, optical, chemical, physical, or mechanical action, and retaining the information in a readable-by-computer status.

The electrical or magnetic action can be exemplified by writing the data to the element on the ROM [Read Only Memory] constructed by use of a fuse. The magnetic or physical action can be exemplified by a phenomenon of toners to form a latent image on a paper medium. Note that the information recorded on the paper medium can be read, e.g., optically. The optical and chemical action can be exemplified by forming a thin film or a rugged portion on a substrate. Incidentally, the information recorded in the ruggedness-utilized mode can be read, e.g., optically. The chemical action can be exemplified by oxidation-reduction reaction on the substrate, forming an oxide film or a nitride film on a semiconductor substrate, or a photo-resist phenomenon. The physical or mechanical action can be exemplified by forming a rugged portion on an emboss card or forming a punch-hole in the paper medium.

Moreover, in the computer-readable mediums, some mediums can be detachably attached to the computer or the computer embedded into the machine or the system. The attachable/detachable computer-readable medium can be exemplified by a DVD (including DVD-R, DVD-RW, DVD-ROM, DVD-RAM), a +R/+RW, a BD (including BD-R, BD-RE, BD-ROM), a CD [Compact Disk] (including CD-R, CD-RW, CD-ROM), an MO [Magneto Optical] disk, other optical disk mediums, a flexible disk (including a floppy disk (Floppy is a trademark of Hitachi Ltd.)), other magnetic disk mediums, a memory card (CompactFlash (trademark of SanDisk Corp. in U.S.A.), SmartMedia (trademark of Toshiba Co., Ltd.), SD card (trademark of SanDisk Corp. in U.S.A., Matsushita Electric Industrial Co., Ltd., and Toshiba Co., Ltd.), Memory Stick (trademark of Sony Corp.), MMC (trademark of Siemens in U.S.A. and SanDisk Corp. in U.S.A.) etc), a magnetic tape, and other tape mediums, and a storage device including, as a built-in component, any one of those mediums. Some of the storage devices have a built-in DRAM [Dynamic Random Access Memory] or SRAM [Dynamic Random Access Memory].

Furthermore, some of the computer-readable mediums are fixedly installed in the computer or the computer embedded into the machine or the system. This type of computer-readable medium can be exemplified by a hard disk, a DRAM, an SRAM, a ROM, an EEPROM [Electronically Erasable and Programmable Read Only Memory], and a flash memory.

All examples and conditional languages recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relates to a showing of the superiority and inferiority of the invention. Although the embodiments of the present inventions have been described in detail, it should be understood that the various changes, substitutions, and alterations could be made here to without departing from the spirit and scope of the invention.

With this configuration, the computer, when receiving the request designating the location information from any one the Web clients, operates so as to generate the Web page data on the basis of the parts specified by the parts identifying information associated with the location information at that point of time and to send the Web page data as a response. Therefore, if the parts identifying information associated with the location information changes, it follows that the details of the Web page data displayed on the Web client also change.

Besides, the location information contains none of parameters for starting up the CGI program for realizing a function of dynamically changing the details of the Web page, and hence it does not happen that the general type of search engine determines, as a dynamic Web page, the Web page based on the Web page data generated by the Web server program according to the present invention. As a result, it follows that this Web page can be listed up in the high order of the search result.

Note that an operation according to the Web page data providing program described above can be realized by a Web page data providing system or a Web page data providing method. Namely, the present invention may be the Web page data providing system including a plurality of means performing the same functions as those of respective means realized by the computer based on the Web page data providing program described above, and may also be a Web page data providing method by which the computer executes the same functions as those of the respective means by way of a plurality of steps. Further, the present invention may also be a readable-by-computer medium stored with the Web page data providing program described above.

Hence, according to the present invention, the details of the Web page can be dynamically changed, and the Web page can be listed up in the high order of the search result of the search engine.

What is claimed is:

1. A non-transitory computer-readable medium encoded with a Web page data providing program for making a computer function as an apparatus comprising:

a first reading unit configured to read, when receiving a request designating location information from any one of Web clients via a network, a parts identifying information, a model number, and second location information of a substitute page each associated with first location information corresponding to the designated location information from a content management table, the content management table storing some pieces parts identifying information selected from within plural pieces of parts identifying information for specifying parts described in a markup language as some elements of Web page data and the first location information allocated to the single Web page data organized by the parts specified by some pieces of selected parts identifying information in a way that associates the parts identifying information and the first location information with each other, the parts identifying information and the first location information being associated with the model number and the second location information of the substitute page to be displayed if there is no stock of commercial products specified by the model number, the model number being a number of the commercial products sold through the Web page displayed based on the Web page data to which the first location information is allocated;

a second reading unit configured to read, for every model number, an in-stock count associated with the model number read out by the first reading unit from an in-stock management table stored with an in-stock count of the commercial products specified by the model number, and to read, if the readout in-stock count is equal to or larger than "1", from a parts management table stored with associated information organized by associating the parts identifying information of the parts with storage location information for specifying a storage location of the parts with respect to every parts, the storage location information associated with the parts identifying information read out by the first reading unit;

a generating unit configured to acquire the parts from the storage location specified by the storage location information read out by the second reading unit, and to generate the single Web page data based on the acquired parts;

a transmitting unit configured to transmit the Web page data generated by the generating unit to the Web client that sends the request; and a second transmitting unit configured to read the in-stock count associated with the model number read out by the first reading unit from the in-stock management table and to transmit, if the readout in-stock count is "0", the Web page data to which the second location information of the substitute page read out by the first reading unit is allocated to the Web client of the request sender.

2. The non-transitory computer-readable medium according to claim 1, wherein the generating unit further configured to incorporate, if the parts identifying information read out by the first reading unit is contained in the parts acquired from the storage location specified by the storage location information read out by the second reading unit, the parts specified by the parts identifying information into the parts containing the parts identifying information.

3. The non-transitory computer-readable medium according to claim 1,
wherein the parts identifying information and the first location information stored in the content management table are further associated with period information for specifying a public viewing period of the Web page data to which the first location information is allocated,
the first reading unit further configured to read, when receiving the request designating the location information from any one of the Web clients via the network, the parts identifying information and the period information each associated with first location information corresponding to the designated location information from the content management table, and
the second reading unit further configured to read, if a date/time when receiving the request is within the period specified by the period information read out by the first reading unit, the storage location information associated with the parts identifying information read out by the first reading unit from the parts management table.

4. A Web page data providing system comprising:
a first storage unit that stores a parts management table with, with respect to each piece of parts described in a markup language as some elements of Web page data, associated information organized by associating parts identifying information for specifying the parts with storage location information for specifying a storage location of the parts;

a second storage unit that stores a content management table with some pieces of parts identifying information selected from within plural pieces of parts identifying information and first location information allocated to single Web page data organized by the parts specified by the parts identifying information in a way that associates the parts identifying information and the first location information with each other, the parts identifying information and the first location information being associated with a model number and second location information of a substitute page to be displayed if there is no stock of commercial products specified by the model number, the model number being a number of the commercial products sold through the Web page displayed based on the Web page data to which the first location information is allocated;

a third storage unit that stores an in-stock management table with an in-stock count of the commercial products specified by the model number, a first reading unit that reads, when receiving a request including location information from any one of Web clients via a network, the parts identifying information, the model number, and the second location information of the substitute page each associated with the first location information corresponding to the location information included in the received request from the content management table;

a second reading unit that reads an in-stock count associated with the model number read out by the first reading unit from the in-stock management table, and reads, if the readout in-stock count is equal to or larger than "1", the storage location information associated with the parts identifying information read out by the first reading unit from the parts management table;

a generating unit that acquires the parts from the storage location specified by the storage location information read out by the second reading unit, and generates the single Web page data based on the acquired parts; and a transmitting unit that transmits the Web page data generated by the generating unit to the Web client that sends the request; and a second transmitting unit that reads the in-stock count associated with the model number read out by the first reading unit from the in-stock management table and transmits, if the readout in-stock count is "0", the Web page data to which the second location information of the substitute page read out by the first reading unit is allocated to the Web client of the request sender.

5. The Web page data providing system according to claim 4, wherein the generating unit that further incorporates, if the parts identifying information read out by the first reading unit is contained in the parts acquired from the storage location specified by the storage location information read out by the second reading unit, the parts specified by the parts identifying information into the parts containing the parts identifying information.

6. The Web page data providing system according to claim 4,
wherein the parts identifying information and the first location information stored in the content management table are further associated with period information for specifying a public viewing period of the Web page data to which the first location information is allocated,
the first reading unit that further reads, when receiving the request designating the location information from any one of the Web clients via the network, the parts identifying information and the period information each associated with the first location information corresponding to the designated location information from the content management table, and
the second reading unit that further read, if a date/time when receiving the request is within the period specified by the period information read out by the first reading unit, the storage location information associated with the parts identifying information read out by the first reading unit from the parts management table.

7. A Web page data providing method comprising:
first reading, when receiving a request designating location information from any one of Web clients via a network, a parts identifying information, a model number, and second location information of a substitute page each associated with first location information corresponding to the designated location information from a content management table, the content management table storing some pieces parts identifying information selected from within plural pieces of parts identifying information for specifying parts described in a markup language as some elements of Web page data and the first location information allocated to the single Web page data organized by the parts specified by some pieces of selected parts identifying information in a way that associates the parts identifying information and the first location information with each other, the parts identifying information and the first location information being associated with the model number and the second location information of the substitute page to be displayed if there is no stock of commercial products specified by the model number, the model number being a number of the commercial products sold through the Web page displayed based on the Web page data to which the first location information is allocated;
second reading, for every model number, an in-stock count associated with the model number read out in the first reading from an in-stock management table stored with an in-stock count of the commercial products specified by the model number, and reading, if the readout in-stock count is equal to or larger than "1", from a parts management table stored with associated information organized by associating the parts identifying information of the parts with storage location information for specifying a storage location of the parts with respect to every parts, the storage location information associated with the parts identifying information read out in the first reading;
acquiring the parts from the storage location specified by the storage location information read out in the second reading;
generating the single Web page data based on the acquired parts;
transmitting the Web page data generated in the generating to the Web client that sends the request; and
second transmitting, if the readout in-stock count is "0", the Web page data to which the second location information of the substitute page read out in the first reading is allocated to the Web client that sends the request.

8. The Web page data providing method according to claim 7, wherein the generating further includes incorporating, if the parts identifying information read out in the first reading step is contained in the parts acquired from the storage location specified by the storage location information read out in the second reading, the parts specified by the parts identifying information into the parts containing the parts identifying information.

9. The Web page data providing method according to claim 7,
wherein the parts identifying information and the first location information stored in the content management table are further associated with period information for specifying a public viewing period of the Web page data to which the first location information is allocated,
wherein the first reading further includes reading, when receiving the request designating the location information from any one of the Web clients via the network, the parts identifying information and the period information each associated with the first location information corresponding to the designated location information from the content management table, and
wherein the second reading further includes reading, if a date/time when receiving the request is within the period specified by the period information read out in the first reading, the storage location information associated with the parts identifying information read out in the first reading from the parts management table.

* * * * *